United States Patent
Tamura

(10) Patent No.: US 10,775,832 B2
(45) Date of Patent: Sep. 15, 2020

(54) CLOCK DETERMINATION APPARATUS AND CLOCK DETERMINATION METHOD

(71) Applicant: MegaChips Corporation, Osaka (JP)

(72) Inventor: Mitsuru Tamura, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 0 days.

(21) Appl. No.: 16/384,964

(22) Filed: Apr. 16, 2019

(65) Prior Publication Data

US 2019/0332135 A1 Oct. 31, 2019

(30) Foreign Application Priority Data

Apr. 27, 2018 (JP) .................. 2018-087112

(51) Int. Cl.
*G06F 1/04* (2006.01)
*G06F 1/06* (2006.01)

(52) U.S. Cl.
CPC ..................... *G06F 1/06* (2013.01)

(58) Field of Classification Search
CPC . G06F 1/06; G06F 21/725; G06F 1/08; G06F 21/755; H04L 9/003
USPC ........................................................ 327/299
See application file for complete search history.

(56) References Cited

U.S. PATENT DOCUMENTS

| 6,343,096 B1* | 1/2002 | Davidsson | H03K 5/19 327/151 |
| 2003/0094974 A1* | 5/2003 | Noguchi | H03D 13/003 327/3 |
| 2006/0132190 A1* | 6/2006 | Driediger | G01R 23/005 327/47 |

FOREIGN PATENT DOCUMENTS

| JP | 8-8889 A | 1/1996 |
| JP | 2003-337750 A | 11/2003 |

* cited by examiner

*Primary Examiner* — Ryan Jager
(74) *Attorney, Agent, or Firm* — Xsensus LLP

(57) ABSTRACT

A clock determination apparatus includes a signal wire and a clock determiner. A clock signal is input to the signal wire. A period made up of cycles corresponding to a predetermined number of cycles of the clock signal is referred to as a unit period. The clock determiner includes circuitry configured to perform determination processing whether the clock signal is a random clock signal including a cycle changing substantially irregularly as time proceeds or a regular clock signal including substantially a constant cycle based on a comparison between waveforms of the clock signals in a plurality of unit periods.

14 Claims, 21 Drawing Sheets

| CLOCK SIGNAL | | | PATTERN INFORMATION | | | | | | | |
|---|---|---|---|---|---|---|---|---|---|---|
| | | | Tk1 | Tk2 | Tk3 | Tk4 | Tk5 | Tk6 | Tk7 | Tk8 |
| CL1 (CLa) | UNIT PERIOD | TP2 | 0 | 1 | 0 | 0 | 1 | 1 | 0 | 0 |
| | | TP1 | 0 | 0 | 1 | 0 | 1 | 0 | 1 | 0 |
| | COINCIDENCE/ NON-COINCIDENCE | | ○ | × | × | ○ | ○ | × | × | ○ |
| CL2 (CLb) | UNIT PERIOD | TP2 | 1 | 1 | 1 | 1 | 1 | 1 | 1 | 1 |
| | | TP1 | 1 | 1 | 1 | 1 | 1 | 1 | 1 | 1 |
| | COINCIDENCE/ NON-COINCIDENCE | | ○ | ○ | ○ | ○ | ○ | ○ | ○ | ○ |

F I G. 7
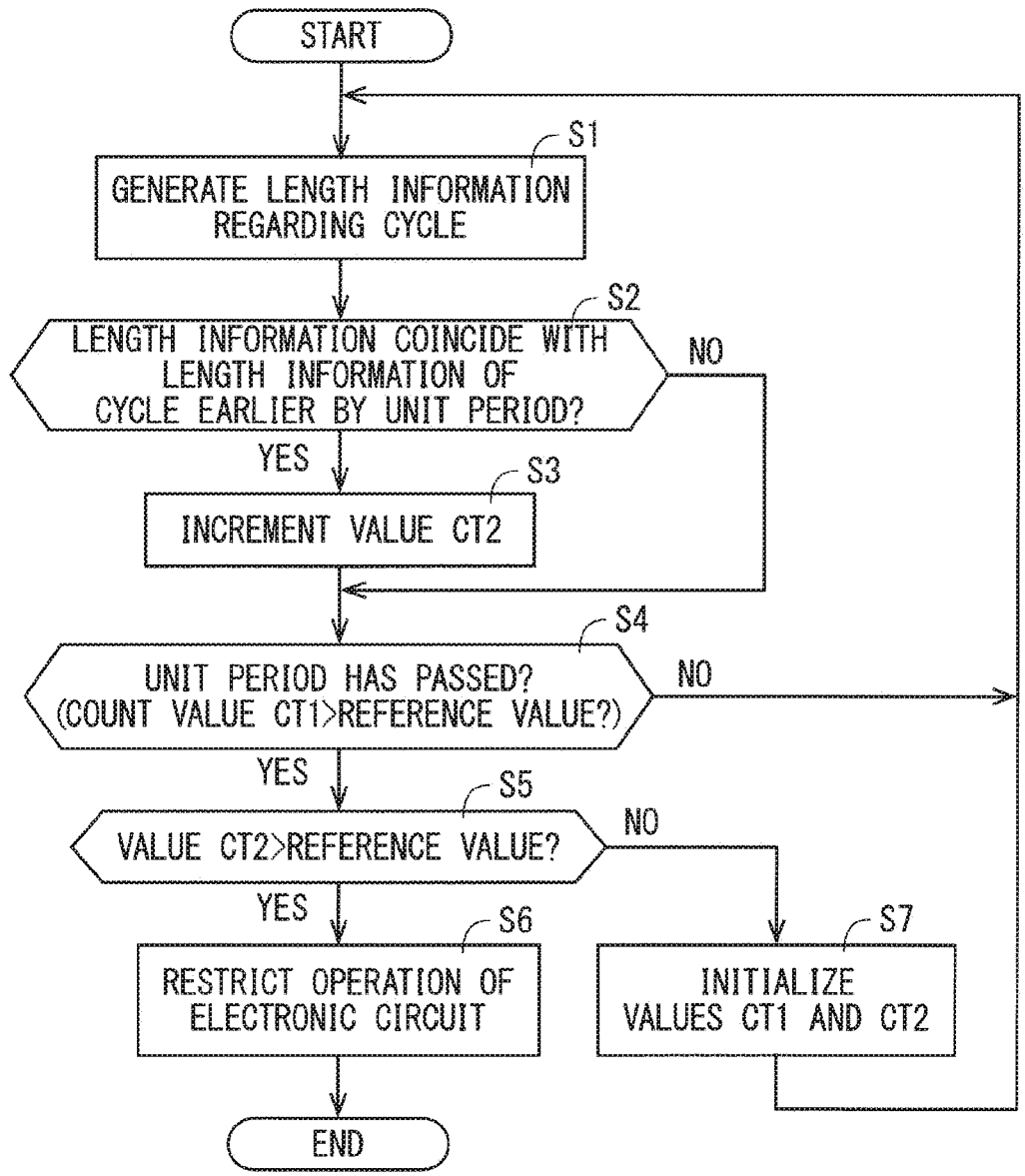

FIG. 9

| {D1[10], ···, D1[1]} |
|---|
| {H, H, H, H, H, H, H, H, H, L} |
| {H, H, H, H, H, H, H, H, L, L} |
| {H, H, H, H, H, H, H, L, L, L} |
| {H, H, H, H, H, H, L, L, L, L} |
| {H, H, H, H, H, L, L, L, L, L} |
| {H, H, H, H, L, L, L, L, L, L} |
| {H, H, H, L, L, L, L, L, L, L} |
| {H, H, L, L, L, L, L, L, L, L} |
| {H, L, L, L, L, L, L, L, L, L} |
| {L, L, L, L, L, L, L, L, L, L} |

FIG. 10

| CLOCK SIGNAL | | | PATTERN INFORMATION | | | | | | | |
|---|---|---|---|---|---|---|---|---|---|---|
| | | | Tk1 | Tk2 | Tk3 | Tk4 | Tk5 | Tk6 | Tk7 | Tk8 |
| CL1 (CLa) | UNIT PERIOD | TP3 | 0 | 1 | 0 | 1 | 0 | 1 | 0 | 1 |
| | | TP2 | 0 | 1 | 0 | 0 | 1 | 1 | 0 | 0 |
| | | TP1 | 0 | 0 | 1 | 0 | 1 | 0 | 1 | 0 |
| | COINCIDENCE/NON-COINCIDENCE | | ○ | × | × | × | × | × | × | × |
| CL2 (CLb) | UNIT PERIOD | TP3 | 1 | 1 | 1 | 1 | 1 | 1 | 1 | 1 |
| | | TP2 | 1 | 1 | 1 | 1 | 1 | 1 | 1 | 1 |
| | | TP1 | 1 | 1 | 1 | 1 | 1 | 1 | 1 | 1 |
| | COINCIDENCE/NON-COINCIDENCE | | ○ | ○ | ○ | ○ | ○ | ○ | ○ | ○ |

F I G. 17

|  | PATTERN INFORMATION IS NOT SIMILAR (J21=L) | PATTERN INFORMATION IS SIMILAR (J21=H) |
|---|---|---|
| THERE IS LONG CYCLE (OR SHORT CYCLE) (J24=L) | EXPECTED CLOCK SIGNAL CL1 | UNEXPECTED CLOCK SIGNAL CL2 |
| THERE IS NO LONG CYCLE (OR NO SHORT CYCLE) (J24=H) | UNEXPECTED CLOCK SIGNAL CL2 | UNEXPECTED CLOCK SIGNAL CL2 |

F I G. 2 0

| CONDITION | DETERMINATION RESULT |
|---|---|
| PATTERN INFORMATION IS NOT SIMILAR, THERE IS LONG CYCLE (OR SHORT CYCLE), AND CYCLE IS WITHIN ALLOWABLE RANGE (J21=J22=J23=J24=L) | EXPECTED CLOCK SIGNAL CL1 |
| PATTERN INFORMATION IS SIMILAR (J21=H) | UNEXPECTED CLOCK SIGNAL CL2 |
| PATTERN INFORMATION IS NOT SIMILAR, AND THERE IS NO LONG CYCLE (OR NOT SHORT CYCLE) (J21=L and J24=H) | |
| CYCLE IS OUT OF ALLOWABLE RANGE (J22=H or J23=H) | |

FIG. 22

| Tref11 (30 [ns]) | Tref12 (36 [ns]) |
|---|---|
| {D1[10], ···, D1[1]} | {D1[12], ···, D1[1]} |
| {H, H, H, H, H, H, H, H, H, L} | {H, H, H, H, H, H, H, H, H, H, H, L} |
| {H, H, H, H, H, H, H, H, L, L} | {H, H, H, H, H, H, H, H, H, H, L, L} |
| {H, H, H, H, H, H, H, L, L, L} | {H, H, H, H, H, H, H, H, H, L, L, L} |
| {H, H, H, H, H, H, L, L, L, L} | {H, H, H, H, H, H, H, H, L, L, L, L} |
| {H, H, H, H, H, L, L, L, L, L} | {H, H, H, H, H, H, H, L, L, L, L, L} |
| {H, H, H, H, L, L, L, L, L, L} | {H, H, H, H, H, H, L, L, L, L, L, L} |
| {H, H, H, L, L, L, L, L, L, L} | {H, H, H, H, H, L, L, L, L, L, L, L} |
| {H, H, L, L, L, L, L, L, L, L} | {H, H, H, H, L, L, L, L, L, L, L, L} |
| {H, L, L, L, L, L, L, L, L, L} | {H, H, H, L, L, L, L, L, L, L, L, L} |
| {L, L, L, L, L, L, L, L, L, L} | {H, H, L, L, L, L, L, L, L, L, L, L} |
| | {H, L, L, L, L, L, L, L, L, L, L, L} |
| | {L, L, L, L, L, L, L, L, L, L, L, L} |

CLOCK DETERMINATION APPARATUS AND CLOCK DETERMINATION METHOD

CROSS-REFERENCE TO RELATED APPLICATION

The present application claims priority to JP 2018-087112 filed Apr. 27, 2018, the entire contents of which are incorporated herein by reference.

BACKGROUND OF THE INVENTION

Field of the Invention

The present invention relates to a clock determination apparatus and a clock determination method.

Description of the Background Art

There is conventionally a technique that an illegal third party attacks an information processing circuit, thereby illegally acquiring confidential information stored in the information processing circuit. Examples of such an attack include a side channel attack (for example, a power analysis attack analyzing a consumed power of the information processing circuit and an electromagnetic wave analysis attack analyzing an electromagnetic wave leaked from the information processing circuit).

In the meanwhile, a technique of making such an acquisition of the confidential information difficult is also proposed (for example, Japanese Patent Application Laid-Open No. 2003-337750). For example, in Japanese Patent Application Laid-Open No. 2003-337750, a module includes a clock conversion mechanism and a submodule. A clock signal is input to the clock conversion mechanism. The clock conversion mechanism converts this clock signal, and outputs the converted clock signal to the submodule. More specifically, the clock conversion mechanism generates a pseudorandom number sequence based on the clock signal, and outputs this pseudorandom number sequence as the converted clock signal to the submodule. The submodule operates based on the input clock signal. Since a cycle of the converted clock signal irregularly changes, an operation timing of the submodule is hardly identified by a third party. Thus, even if the third party performs the attack on the submodule, the confidential information stored in the submodule is hardly acquired.

Also cited as a technique relating to the present application is Japanese Patent Application Laid-Open No. 8-008889.

SUMMARY

An aspect of a clock determination apparatus includes a signal wire to which a clock signal is input and a clock determiner including circuitry configured to perform determination processing whether the clock signal is a random clock signal including a cycle changing substantially irregularly as time proceeds or a regular clock signal including substantially a constant cycle based on a comparison between waveforms of the clock signals in a plurality of unit periods, each of the unit periods indicating a period made up of cycles corresponding to a predetermined number of cycles of the clock signal.

An aspect of a clock determination method performs a determination processing whether the clock signal is a random clock signal including a cycle changing substantially irregularly as time proceeds or a regular clock signal including substantially a constant cycle based on a comparison between waveforms of the clock signals in a plurality of unit periods, each of the unit periods indicating a period made up of cycles corresponding to a predetermined number of cycles of the clock signal input to a signal wire.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a flow chart illustrating an example of an operation of an information processing device.

FIG. 9 is a drawing illustrating an example of a reference pattern in tabular form.

FIG. 10 is a drawing illustrating an example of a reference pattern in tabular form.

FIG. 17 is a drawing illustrating an example of a determination condition in tabular form.

FIG. 20 is a drawing illustrating an example of a determination condition in tabular form.

FIG. 22 is a drawing illustrating an example of a reference pattern in tabular form.

DESCRIPTION OF THE PREFERRED EMBODIMENTS

First Embodiment

Figure 1:
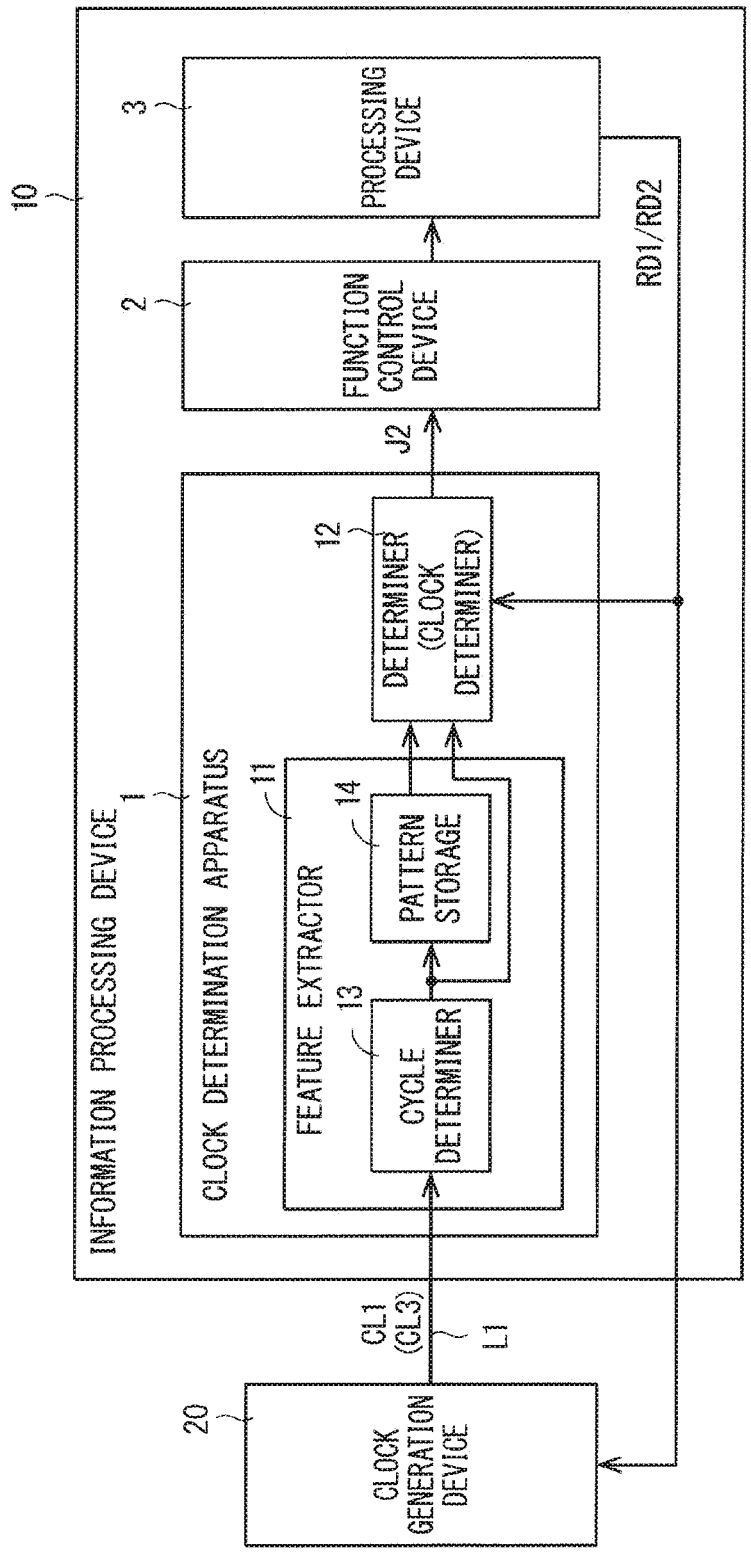
FIG. 1 is a drawing schematically illustrating an example of a configuration of an information processing device.

FIG. 1 is a drawing schematically illustrating an example of a configuration of an information processing device 10. The information processing device 10 is connected to a clock generation device 20 via a signal wire L1.

<Clock Generation Device>

The clock generation device 20 generates a clock signal CL1, and outputs the clock signal CL1 to the signal wire L1. For example, the clock generation device 20 includes an oscillator such as a crystal oscillator, an LC oscillator, an RC oscillator, a ring oscillator, a ceramic oscillator, or a micro electro mechanical systems (MEMS) oscillator as an oscillation source. If the MEMS oscillator is applied as the oscillation source, characteristics of the output signal from the oscillator can be improved, and a size of the oscillator can be reduced.

The clock generation device 20 generates the clock signal CL1 based on the periodic output signal being output from the oscillator. The clock generation device 20 may selectively output a random clock signal CLa and a regular clock signal CLb as the clock signal CL1. The random clock signal CLa is a clock signal whose cycle changes substantially irregularly as time proceeds, and the regular clock signal CLb is a clock signal whose cycle is substantially constant.

For example, the clock generation device 20 includes a phase locked loop (PLL) circuit appropriately performing a frequency dividing and/or a frequency multiplying of the output signal of the oscillator to generate the regular clock signal CLb.

The clock generation device 20 has a clock conversion mechanism as is the case in Japanese Patent Application Laid-Open No. 2003-337750. This clock conversion mechanism includes a random number generation circuit, for example, and an output signal of the oscillator is input to the random number generation circuit. The random number generation circuit generates a random number sequence based on the output signal, and outputs the random number sequence as the random clock signal CLa.

The clock generation device 20 further includes a selection unit (for example, a switch) for selecting the random clock signal CLa and the regular clock signal CLb. To the selection unit, the regular clock signal CLb is input from the PLL circuit, and the random clock signal CLa is input from the clock conversion mechanism. The selection unit selects one of the random clock signal CLa and the regular clock signal CLb based on a request from the information processing device 10, and outputs the selected clock signal to the signal wire L1 as the clock signal CL1.

Figure 2:
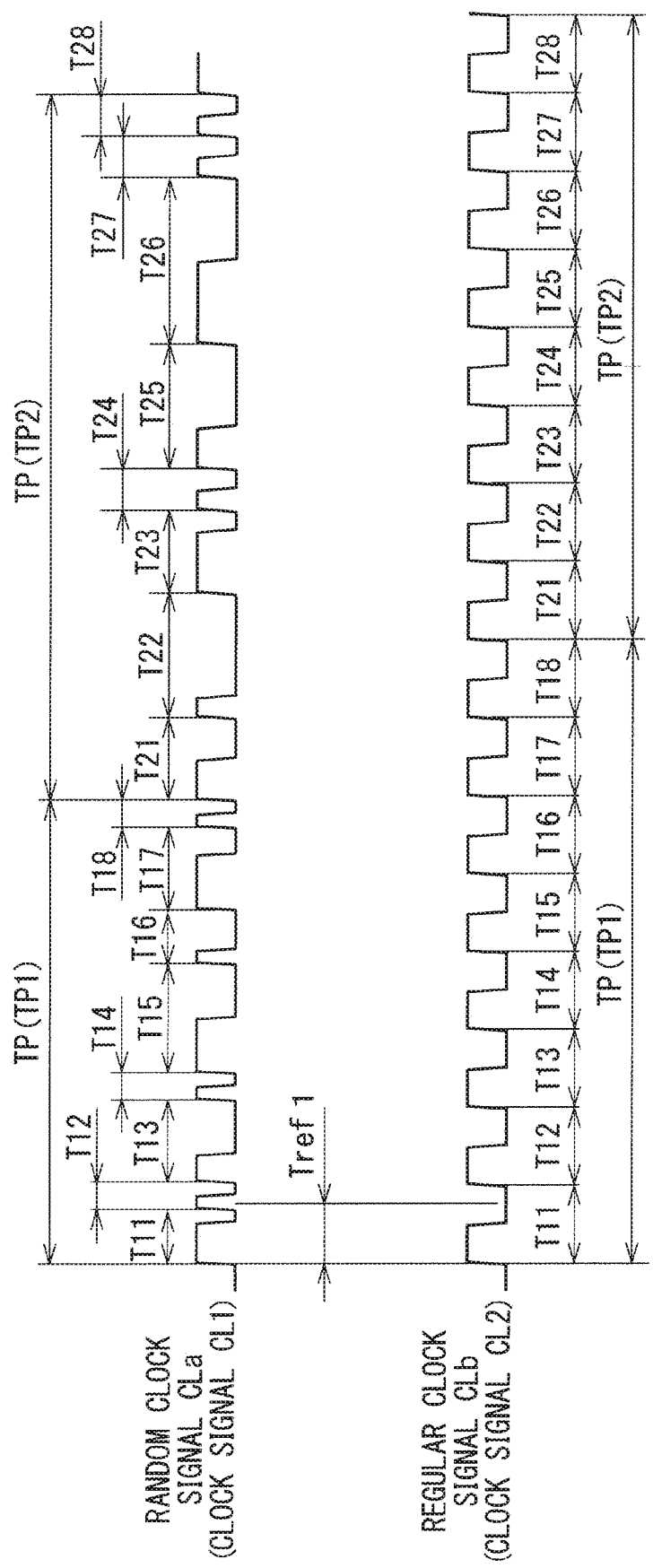
FIG. 2 is a drawing schematically illustrating an example of a clock signal.

FIG. 2 is a drawing schematically illustrating an example of the random clock signal CLa and the regular clock signal CLb. The cycle of the random clock signal CLa changes substantially irregularly. An allowable range which the cycle of the random clock signal CLa can take is previously set. For example, a lower limit Tmin and an upper limit Tmax of the allowable range are set to 10 [ns] and 60 [ns], for example. The cycle of the random clock signal CLa changes substantially irregularly within the allowable range.

In the example in FIG. 2, a duty of the random clock signal CLa also changes substantially irregularly as time proceeds. An allowable range of the duty is also previously set. However, the upper limit and the lower limit of the allowable range are not directly set herein, but are indirectly set with the other parameter. More specifically, a minimum value THmin of a period when the random clock signal CLa takes H (high) (a pulse width) and a minimum value TLmin of a period when the random clock signal CLa takes L (low) (a width of a gap between the pulses) are set, thus the allowable range of the duty is indirectly set. Herein, both of the minimum values THmin and TLmin are set to 5 [ns], for example.

The cycle and the duty of the regular clock signal CLb are substantially constant regardless of the lapse of time as exemplified in FIG. 2. Each of the cycle and the duty of the regular clock signal CLb is set to satisfy the allowable range described above.

<Information Processing Device>

The information processing device 10 operates based on the clock signal CL1 being input from the clock generation device 20. With reference to FIG. 1, the information processing device 10 includes a clock determination apparatus 1, a function control device 2, and a processing device 3. These devices may be housed in a resin package, for example. The information processing device 10 may be made up of a plurality of dies, or may also be made up of one die. The die is also referred to as a wafer chip.

<Processing Device>

The processing device 3 operates based on the clock signal CL1 being input via the signal wire L1. For example, the clock signal CL1 is input to the processing device 3 via the clock determination apparatus 1 and the function control device 2 in this order.

The processing device 3 is a logic integrated circuit (IC), for example. The processing device 3 can perform confidential processing using confidential information with high secrecy. Examples of the confidential processing may include encryption processing and decoding processing, and examples of the confidential information may include an encryption key and a decoding key. More specifically, the processing device 3 receives a first code text from outside not shown, and performs the decoding processing on the first code text with a predetermined key (a decoding key), thereby generating a first plain text. The processing device 3 performs the encryption processing on a second plain text with a predetermined key (an encryption key), thereby generating a second code text, and outputs the second code text to the outside. An algorithm used in such encryption processing and decoding processing needs not be particularly limited, however, advanced encryption standard (AES) can be adopted, for example.

Alternatively, authentication processing can be exemplified as the confidential processing. More specifically, the processing device 3 receives authentication information (for example, information of a user name, a password, and biological information) from the outside. The processing device 3 determines whether or not the authentication information coincides with (or is similar to) registered information which is previously set, and determines legality of the authentication information based on the determination result. In such authentication processing, the registered information corresponds to the confidential information.

The processing device 3 can also perform normal processing different from the confidential processing. The normal processing is processing using information with lower secrecy than the confidential information. A type of the normal processing needs not be limited, but may include image processing, for example.

The processing device 3 transmits a request of the clock signal CL1 in accordance with a processing content (the normal processing or the confidential processing) to the clock generation device 20. As a more specific example of the operation, the processing device 3 outputs a request signal RD1 for requesting the regular clock signal CLb to the clock generation device 20 when the processing device 3 starts the normal processing. Upon receiving the request signal RD1, the clock generation device 20 outputs the regular clock signal CLb as the clock signal CL1 to the signal wire L1. Accordingly, the processing device 3 can perform each procedure of the normal processing at substantially a systematic timing. If the cycle of the regular clock signal CLb is set to short, the normal processing can be executed with a high processing speed.

When the processing device 3 starts the confidential processing, the processing device 3 outputs a request signal RD2 for transmitting a request of the random clock signal CLa to the clock generation device 20. Upon receiving the request signal RD2, the clock generation device 20 outputs the random clock signal CLa as the clock signal CL1 to the signal wire L1. Accordingly, the processing device 3 can perform each procedure of the confidential processing at substantially an irregular timing. Thus, even if the third party performs an illegal attack (for example, a power analysis attack or an electromagnetic wave analysis attack) on the information processing device 10, a timing of each procedure is hardly specified, thus the confidential information is hardly acquired.

Figure 3:
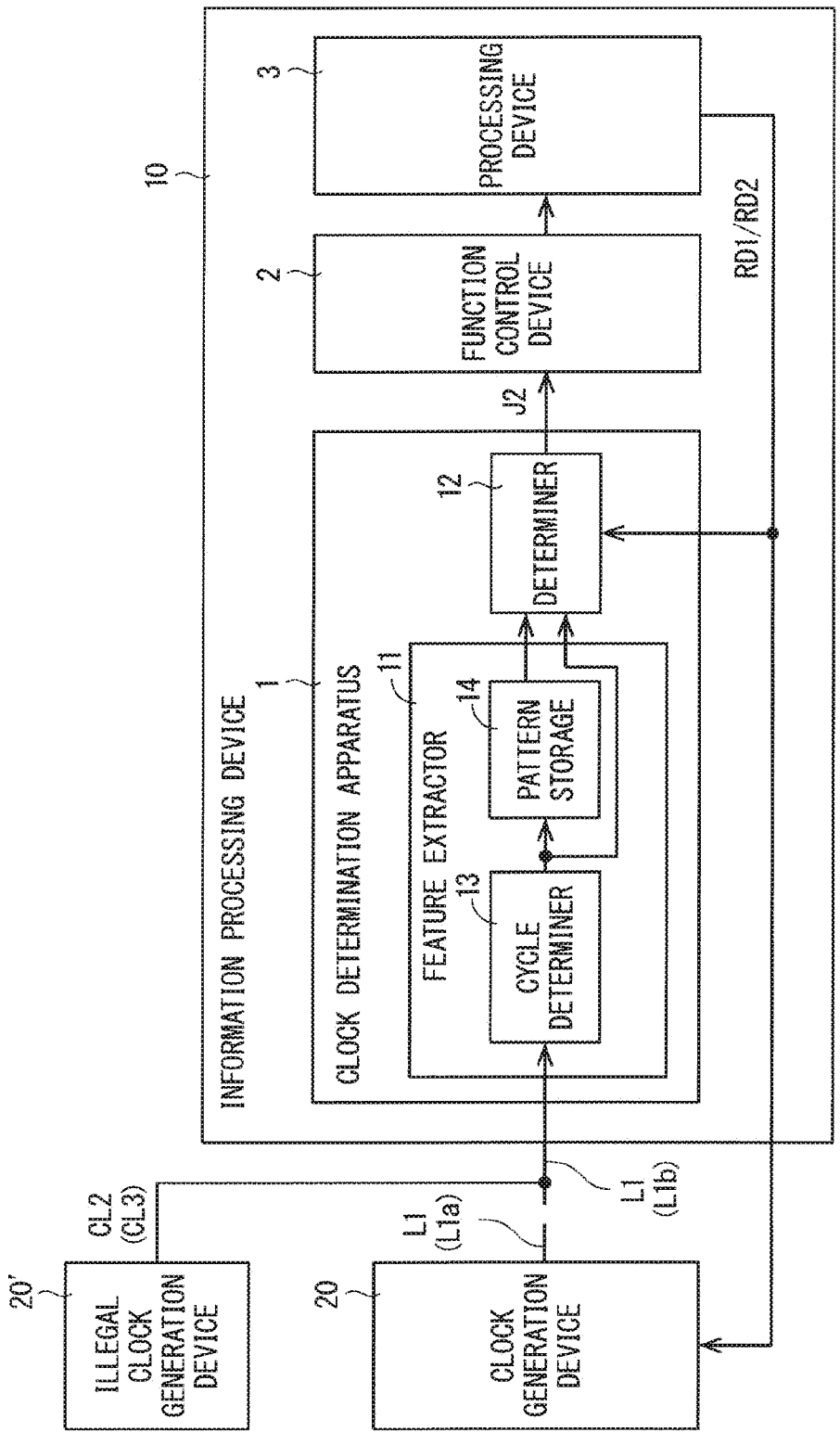
FIG. 3 is a drawing schematically illustrating an example of a configuration of an information processing device.

However, it is considered that the third party separately prepares an illegal clock generation device for purpose of invalidating the random clock signal CLa. FIG. 3 is a drawing schematically illustrating an example of a configuration of the information processing device 10. In the example in FIG. 3, the signal wire L1 is disconnected between the clock generation device 20 and the information processing device 10, and signal wires L1$a$ and L1$b$ are formed. The signal wire L1$a$ constitutes a part of the disconnected signal wire L1 connected to the clock generation device 20, and the signal wire L1$b$ constitutes a part of the disconnected signal wire L1 connected to the information processing device 10. The signal wires L1$a$ and L1$b$ are separated from each other and are not electrically connected to each other.

An illegal clock generation device 20' is connected to the signal wire L1$b$ by the third party. The illegal clock generation device 20' outputs a clock signal CL2 of substantially the constant cycle to the signal wire L1$b$. That is to say, the illegal clock signal CL2 is input to the information processing device 10 instead of the normal clock signal CL1. Thus, at this time, the processing device 3 operates based on the illegal clock signal CL2. If the processing device 3 performs the confidential processing based on the clock signal CL2 of substantially the constant cycle, the confidential information is easily leaked by the illegal attack performed by the third party.

Thus, as exemplified in FIG. 1 and FIG. 3, the information processing device 10 is provided with the clock determination apparatus 1.

The clock signal being input to the information processing device 10 via the signal wire L1 is also referred to as a clock signal CL3 hereinafter. When the normal clock generation device 20 is connected to the information processing device 10, the clock signal CL3 is the normal clock signal CL1, and when the illegal clock generation device 20' is connected to the information processing device 10, the clock signal CL3 is the illegal clock signal CL2.

<Clock Determination Apparatus>

The clock signal CL3 is input to the clock determination apparatus 1 via the signal wire L1. The clock determination apparatus 1 determines whether the clock signal CL3 is the clock signal which is expected or the clock signal which is unexpected. The clock signal which is expected is also referred to as the expected clock signal, and the clock signal which is unexpected is also referred to as the unexpected clock signal hereinafter. In this example, the clock signal CL1 being output by the clock generation device 20 is the expected clock signal, and the clock signal CL2 being output by the illegal clock generation device 20' is the unexpected clock signal.

An operation of the clock determination apparatus 1 in a case where the processing device 3 performs the confidential processing is described as an example hereinafter. When the processing device 3 performs the confidential processing, the expected clock signal CL1 is the random clock signal CLa. "The clock signal CL1" is described in parentheses immediately below the random clock signal CLa to indicate this point in FIG. 2. In the meanwhile, the unexpected clock signal CL2 is the regular clock signal CLb of substantially the constant cycle. "The clock signal CL2" is described in parentheses immediately below the regular clock signal CLb to indicate these this point in FIG. 2. However, this description does not indicate that the cycle of the clock signal CL2 from the illegal clock generation device 20' coincides with the cycle of the regular clock signal CLb from the normal clock generation device 20. The cycle of the illegal clock signal CL2 by the third party may take an optional value.

The clock determination apparatus 1 determines whether the clock signal CL3 is the expected clock signal CL1 or the unexpected clock signal CL2. In other words, the clock determination apparatus 1 determines whether the clock signal CL3 is the random clock signal CLa or the regular clock signal CLb.

In FIG. 2, a unit period TP is indicated in each of the expected clock signal CL1 and the unexpected clock signal CL2. The unit period TP is a period made up of cycles corresponding to a plurality of cycles of the clock signal CL3, and in the example in FIG. 2, the unit period TP is made up of cycles corresponding to eight cycles. FIG. 2 shows unit periods TP1 and TP2 as the continuous two unit periods TP. The unit period TP2 is the unit period TP immediately after the unit period TP1. The unit period TP1 is made up of eight cycles T11 to T18, and the unit period TP2 is made up of eight cycles T21 to T28. A last number of each sign of the cycles T11 to T18 and T21 to T28 indicates an order (a position) of the cycle in each unit period TP. For example, the cycles T13 and T23 are the third cycle in the unit periods TP1 and TP2, respectively.

In the example in FIG. 2, the cycle and the duty of the expected clock signal CL1 change substantially irregularly as time proceeds, thus even if the number of cycles of the unit periods TP1 and TP2 are equal to each other, waveforms of the expected clock signals CL1 in the unit periods TP1 and TP2 are different from each other. That is to say, when the clock signal CL3 is the normal expected clock signal CL1, the waveform of the clock signal CL3 in the unit period TP1 is different from the waveform of the clock signal CL3 in the unit period TP2.

In the meanwhile, the cycle and the duty of the unexpected clock signal CL2 are substantially constant regardless of the lapse of time. Thus, ideally speaking, the waveforms of the unexpected clock signal CL2 in the unit periods TP1 and TP2 coincide with each other. That is to say, ideally speaking, when the clock signal CL3 is the illegal unexpected clock signal CL2, the waveform of the clock signal CL3 in the unit period TP1 coincides with the waveform of the clock signal CL3 in the unit period TP2.

Thus, the clock determination apparatus 1 performs determination processing whether the clock signal CL3 is the expected clock signal CL1 or the unexpected clock signal CL2 (that is to say, the random clock signal CLa or the regular clock signal CLb) based on a comparison between the waveforms of the clock signals CL3 in the plurality of the unit periods TP. For example, the clock determination apparatus 1 determines that the clock signal CL3 is the expected clock signal CL1 when the waveforms of the clock signals CL3 in the plurality of the unit periods TP do not coincide with (or are not similar to) each other, and determines that the clock signal CL3 is the unexpected clock signal CL2 when the waveforms of the clock signals CL3 in the plurality of the unit periods TP coincide with (or are similar to) each other.

More specifically, the clock determination apparatus 1 includes a feature extractor 11 and a determiner 12. The clock signal CL3 is input to the feature extractor 11. The feature extractor 11 extracts a feature of the waveform of the clock signal CL3 in the unit period TP, in which a predetermined number of cycles is set as the unit, from the clock signal CL3. In other words, the feature extractor 11 extracts the information in accordance with the waveform of the clock signal CL3 in each unit period TP as the feature described above, and outputs the feature to the determiner 12. A specific example of the feature is described in detail hereinafter.

The determiner 12 compares the features in the different unit periods TP to determine whether the clock signal CL3 is the expected clock signal CL1 or the unexpected clock signal CL2. More specifically, if the determiner 12 determines that the features do not coincide with or are not similar to each other, the determiner 12 determines that the clock signal CL3 is the expected clock signal CL1 (that is to say, the random clock signal CLa). In the meanwhile, if the determiner 12 determines that the features coincide with or are similar to each other, the determiner 12 determines that the clock signal CL3 is the unexpected clock signal CL2 (that is to say, the regular clock signal CLb). The determiner 12 outputs a determination result J2 thereof to the function control device 2. The determination result J2 is indicated by H/L of an electrical signal. For example, when the clock signal CL3 is the expected clock signal CL1, the determination result J2 is indicated by L, and when the clock signal CL3 is the unexpected clock signal CL2, the determination result J2 is indicated by H. A specific example of the determination processing performed by the determiner 12 is also described in detail hereinafter.

Since the determination result J2 determined by the determiner 12 indicates the determination result of the clock signal CL3, the determiner 12 is considered to be a clock determiner for determining whether the clock signal CL3 is the expected clock signal CL1 (the random clock signal CLa) or the unexpected clock signal CL2 (the regular clock signal CLb).

<Function Control Device>

The function control device 2 can switch permission/restriction of the operation of the processing device 3 in accordance with the determination result J2 of the clock determination apparatus 1. Specifically, the function control device 2 permits the operation of the processing device 3 when the clock signal CL3 is the expected clock signal CL1. Accordingly, the processing device 3 can perform the confidential processing based on the normal expected clock signal CL1. The cycle of the expected clock signal CL1 changes substantially irregularly, thus even if the third party performs the attack on the processing device 3, the confidential information is hardly leaked.

In the meanwhile, the function control device 2 restricts the operation of the processing device 3 when the clock signal CL3 is the unexpected clock signal CL2. For example, when the clock signal CL3 is input to the processing device 3 via the clock determination apparatus 1 and the function control device 2, the function control device 2 stops the output of the clock signal CL3 to the processing device 3. Accordingly, the operation of the processing device 3 can be stopped. Alternatively, if the processing device 3 includes a reset terminal, the function control device 2 may output a reset signal to the processing device 3. The processing device 3 initializes the operation when the reset signal is input. Accordingly, the operation of the processing device 3 can be substantially stopped. Alternatively, if a switch for switching a supply/block of a power source to the processing device 3 is provided, the function control device 2 may control the switch and block a power supply to the processing device 3.

As described above, when the clock determination apparatus 1 detects the illegal unexpected clock signal CL2, the function control device 2 restricts the operation of the processing device 3 in accordance with the detection. Accordingly, even if the third party disconnects the signal wire L1 to connect the illegal clock generation device 20' to the information processing device 10, the operation of the processing device 3 is restricted. This configuration can make it difficult for the illegal third party to acquire the confidential information. More generally speaking, since the operation of the processing device 3 based on the illegal unexpected clock signal CL2 is restricted, a benefit which the illegal third party can acquire can be suppressed.

<Software and Hardware>

Figures 4, 5:
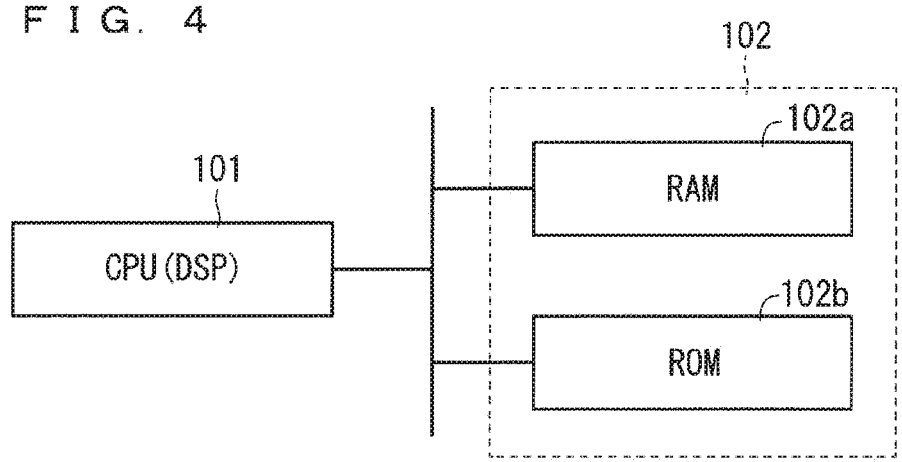
FIG. 4 is a drawing schematically illustrating an example of an inner configuration of a clock determination apparatus.
FIG. 5 is a drawing illustrating an example of pattern information in tabular form.

The functions of the clock determination apparatus 1 and the function control device 2 may be achieved by software, for example. FIG. 4 schematically illustrates an example of a configuration of achieving the functions with the software. As exemplified in FIG. 4, the configuration includes an arithmetic processor 101 and a storage medium 102, for example. The arithmetic processor 101 is a processor such as a central processing unit (CPU) or a digital signal processor (DSP), for example. The storage medium 102 includes a random access memory (RAM) 102a providing an operation region of the arithmetic processor 101 and a read only memory (ROM) 102b storing a program and data, for example. If the arithmetic processor 101 reads out and performs the program stored in the storage medium 102, various functions are achieved. The storage medium 102 may include a non-transitory computer readable recording medium other than a RAM 102a and a ROM 102b. The storage medium 102 may include, for example, a compact hard disk drive and a solid state drive (SSD).

A part or all of the functions of each of the clock determination apparatus 1 and the function control device 2 need not be necessarily achieved by software, but may be achieved by a hardware circuit. That is to say, each of the clock determination apparatus 1 and the function control device 2 is achieved by a circuit group (circuitry) formed of hardware, software, or a composition of them, for example. If a hardware circuit is used, the functions can be achieved by an operation of a dedicated circuit including a logic circuit, for example. A function unit made up of the hardware circuit can achieve high responsiveness.

<Specific Example of Feature>

The feature extractor 11 extracts cycle information regarding the cycle of the clock signal CL3 as information (the feature) in accordance with the waveform of the clock signal CL3 in each unit period TP from the clock signal CL3, for example. Although the cycle information may be a parameter indicating a periodicity of the clock signal CL3 in the unit period TP, applied herein as an example thereof is pattern information on a length of each cycle in the unit period TP (described hereinafter). That is to say, the feature extractor 11 generates the pattern information described hereinafter based on the clock signal CL3.

FIG. 5 is a drawing illustrating an example of the pattern information in tabular form. The pattern information is information indicating the length of each cycle of the clock signal CL3 in the unit period TP. More specifically, the pattern information is information in which length information, which includes information indicating whether each cycle in the unit period TP is longer or shorter than a reference value Tref1, is arranged along an order of the cycle. In the pattern information in FIG. 5, "0 (zero)" indicates that the cycle is shorter than the reference value Tref1, and "1" indicates that the cycle is longer than the reference value Tref1. The reference value Tref1 is a value within an allowable range of the cycle of the expected clock signal CL1 (for example, 10 to 60 [ns]), and is set to a central value of the cycle of the expected clock signal CL1 (for example, 30 [ns]), for example. Herein, the unit period TP is made up of the period corresponding to the eight cycles of the clock signal CL3, thus in the example in FIG. 5, the pattern information is made up of a digit sequence including eight digits. A numeral in each digit of the pattern information indicates the length information of the corresponding cycle.

In FIG. 5, the pattern information in the unit periods TP1 and TP2 are indicated for each of the expected clock signal CL1 and the unexpected clock signal CL2. In the example in FIG. 5, the pattern information of the expected clock signal CL1 in the unit period TP2 is (01001100). The pattern information means that the cycles T21, T23, T24, T27, and T28 are shorter than the reference value Tref1 and the cycles T22, T25, and T26 are longer than the reference value Tref1. In the example in FIG. 5, the pattern information of the expected clock signal CL1 in the unit period TP1 is (00101010). The pattern information means that the cycles T11, T12, T14, T16, and T18 are shorter than the reference value Tref1 and the cycles T13, T15, and T17 are longer than the reference value Tref1.

In the example in FIG. 5, the pattern information of the unexpected clock signal CL2 in the unit period TP2 is (11111111), and means that all of the cycles T21 to T28 are longer than the reference value Tref1. The pattern information of the unexpected clock signal CL2 in the unit period TP1 is the same as the pattern information of the unexpected clock signal CL2 in the unit period TP2. It is because the cycle of the unexpected clock signal CL2 is substantially constant, thus all pieces of the pattern information thereof are normally made up of the same numeral value regardless of the unit period TP.

Accordingly, if the pieces of the pattern information in the unit periods TP1 and TP2 of the clock signals CL3 being input to the information processing device 10 coincide with each other, the clock signal CL3 is considered to be the unexpected clock signal CL2. In the meanwhile, if the pieces of the pattern information are different from each other, the clock signal CL3 is considered to be the expected clock signal CL1.

In view of noise, even if the pieces of the pattern information do not completely coincide with each other but if they nearly coincide with each other, the clock signal CL3 may be considered to be the unexpected clock signal CL2. That is to say, it is also applicable that a similarity ratio between the pieces of the pattern information in the unit periods TP1 and TP2 is calculated, and when the similarity ratio is lower than a similarity ratio reference value, the clock signal CL3 is determined to be the expected clock signal CL1, and when the similarity ratio is higher than the similarity ratio reference value, the clock signal CL3 is determined to be the unexpected clock signal CL2.

A cycle group is introduced to describe an example of the similarity ratio. The cycle group herein is a group made up of a cycle in the same order (position) in the plurality of the unit periods TP. For example, a first cycle group is made up of the cycles T11 and T21, and a second cycle group is made up of the cycles T12 and T22. A total number of cycle groups having the length information of the cycle coinciding with each other (referred to as the coinciding number hereinafter) can be adopted as the similarity ratio, for example. In the example in FIG. 5, a state where the pieces of the length information of the cycles belonging to the same cycle group coincide with each other is indicated by "○", and a state where the pieces of the length information do not coincide with each other is indicated by "×".

Such a similarity ratio is calculated as follows. The clock determination apparatus 1 determines whether or not the pieces of the length information of a $n^{th}$ (n indicates a natural number of 1 to N) cycle in each of the plurality of unit periods coincide with each other for the first to $N^{th}$ cycles, and calculates the number of cycles determined to have the length information coinciding with each other as the similarity ratio.

With regard to the expected clock signal CL1 in FIG. 5, the pieces of the length information of the cycles T11 and T21 in the first cycle group coincide with each other, the pieces of the length information of the cycles T14 and T24 in the fourth cycle group coincide with each other, the pieces of the length information of the cycles T15 and T25 in the fifth cycle group coincide with each other, and the pieces of the length information of the cycles T18 and T28 in the eighth cycle group coincide with each other. Thus, the similarity ratio (the coinciding number herein) of the pieces of the pattern information of the clock signal CL1 in the unit periods TP1 and TP2 is four.

In the meanwhile, with regard to the unexpected clock signal CL2 in FIG. 5, the pieces of the length information coincide with each other in all of the cycle groups. Thus, the similarity ratio (the coinciding number herein) of the pieces of the pattern information of the unexpected clock signal CL2 in the unit periods TP1 and TP2 is eight.

Thus, the determiner 12 acquires the similarity ratio of the clock signal CL3 described above based on the pattern information being input from the feature extractor 11, and determines whether or not the similarity ratio is higher than the similarity ratio reference value (for example, six). When the similarity ratio is lower than the similarity ratio reference value, the determiner 12 determines that the clock signal CL3 is the expected clock signal CL1, and when the similarity ratio is higher than the similarity ratio reference value, the determiner 12 determines that the clock signal CL3 is the unexpected clock signal CL2.

<More Specific Configuration of Clock Determination Apparatus>

Figure 6:
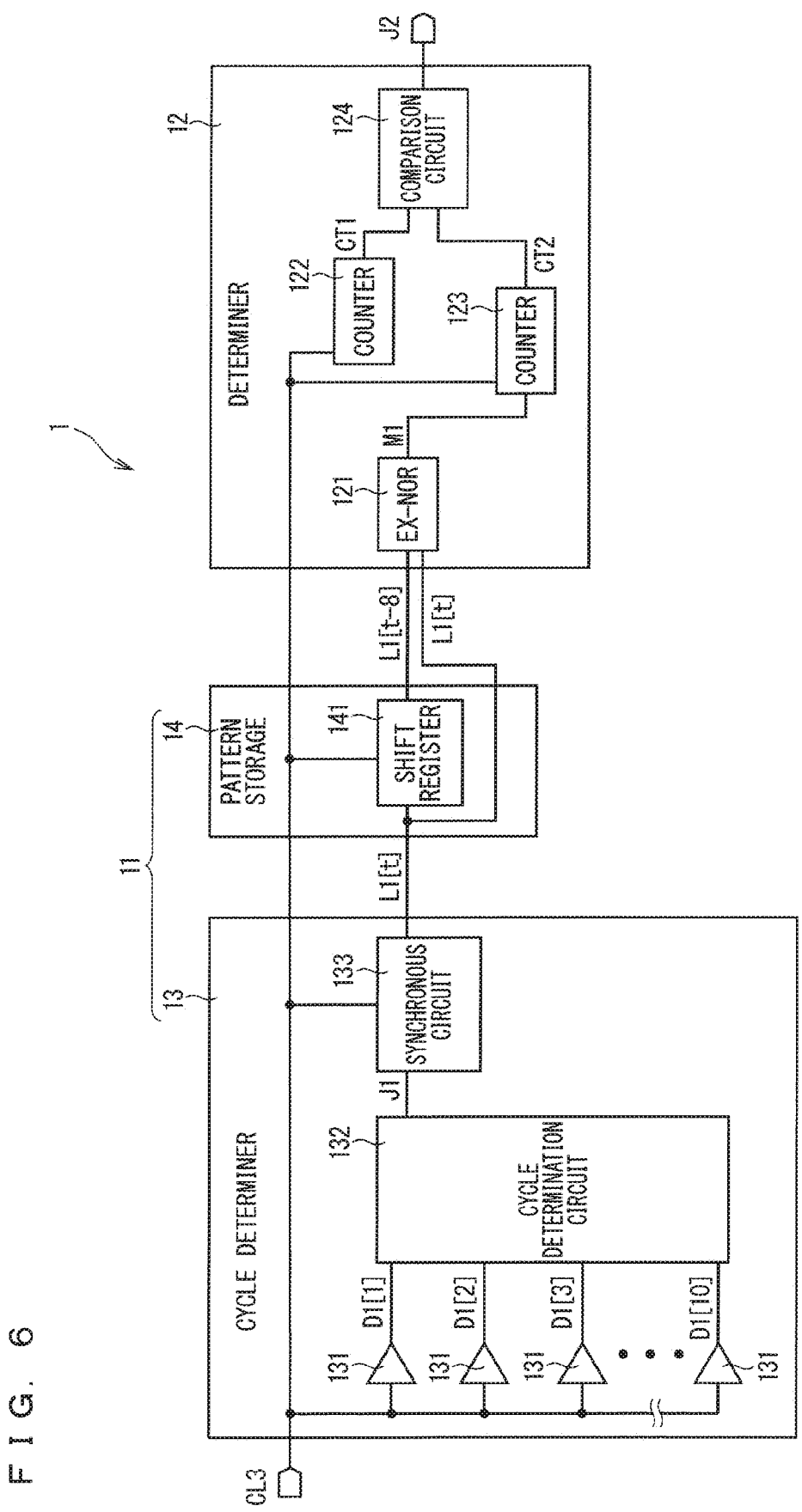
FIG. 6 is a drawing schematically illustrating an example of an inner configuration of a clock determination apparatus.

FIG. 6 is a drawing illustrating an example of a more specific inner configuration of the clock determination apparatus 1, and FIG. 7 is a flow chart illustrating an example of the operation of the clock determination apparatus 1. Firstly, in Step S1, the clock determination apparatus 1 generates length information L1 [t] indicating whether or not the cycle of the clock signal CL3 is longer than the reference value Tref1. With reference to FIG. 6, the feature extractor 11 includes a cycle determiner 13 and a pattern storage 14, and the cycle determiner 13 generates the length information L1 [t], and outputs the length information L1 [t] to the pattern storage 14. In the example in FIG. 6, the cycle determiner 13 includes a plurality of delay elements 131, a cycle determination circuit 132, and a synchronous circuit 133, and they cooperate with each other to generate the length information L1 [t].

The clock signal CL3 is input to the plurality of delay elements 131. The plurality of delay elements 131 delays the clock signal CL3 with delay times different from each other, and outputs the delayed signal to the cycle determination circuit 132. For example, the delay element 131 is a delay element which does not need the clock signal for a delay operation.

In the example in FIG. 6, the plurality of delay elements 131 are arranged side by side. An order in accordance with an arrangement order is introduced hereinafter for a purpose of description. A first delay element 131 means a delay element 131 arranged at a front of the arrangement order.

The delay time of an $x^{th}$ delay element 131 is set to a product of a predetermined time $\Delta t1$ and x ($\Delta t1 \cdot x$), for example. That is to say, a difference between the delay times of the adjacent delay elements 131 is set to the predetermined time $\Delta t1$. The predetermined time $\Delta t1$ is set to a smaller one of the minimum value THmin of the pulse width of the expected clock signal CL1 and the minimum value TLmin of the width between the pulses. In the example described above, both the minimum values THmin and TLmin are set to 5 [ns], thus the predetermined time $\Delta t1$ is set to equal to or smaller than 5 [ns]. As a more specific example, the predetermined time $\Delta t1$ is set to 3 [ns], for example. A number N1 of the delay element 131 is set so that a product of the number N1 and the predetermined time $\Delta t1$ ($\Delta t1 \cdot N1$) is equal to or larger than the reference value Tref1 (for example, 30 [ns]). Herein, the number N1 is set to ten so that the product ($\Delta t1 \cdot N1$) is 30 [ns] equal to the reference value Tref1. The output signal of the $x^{th}$ delay element 131 is referred to as the signal D1 [x] hereinafter.

Figure 8:
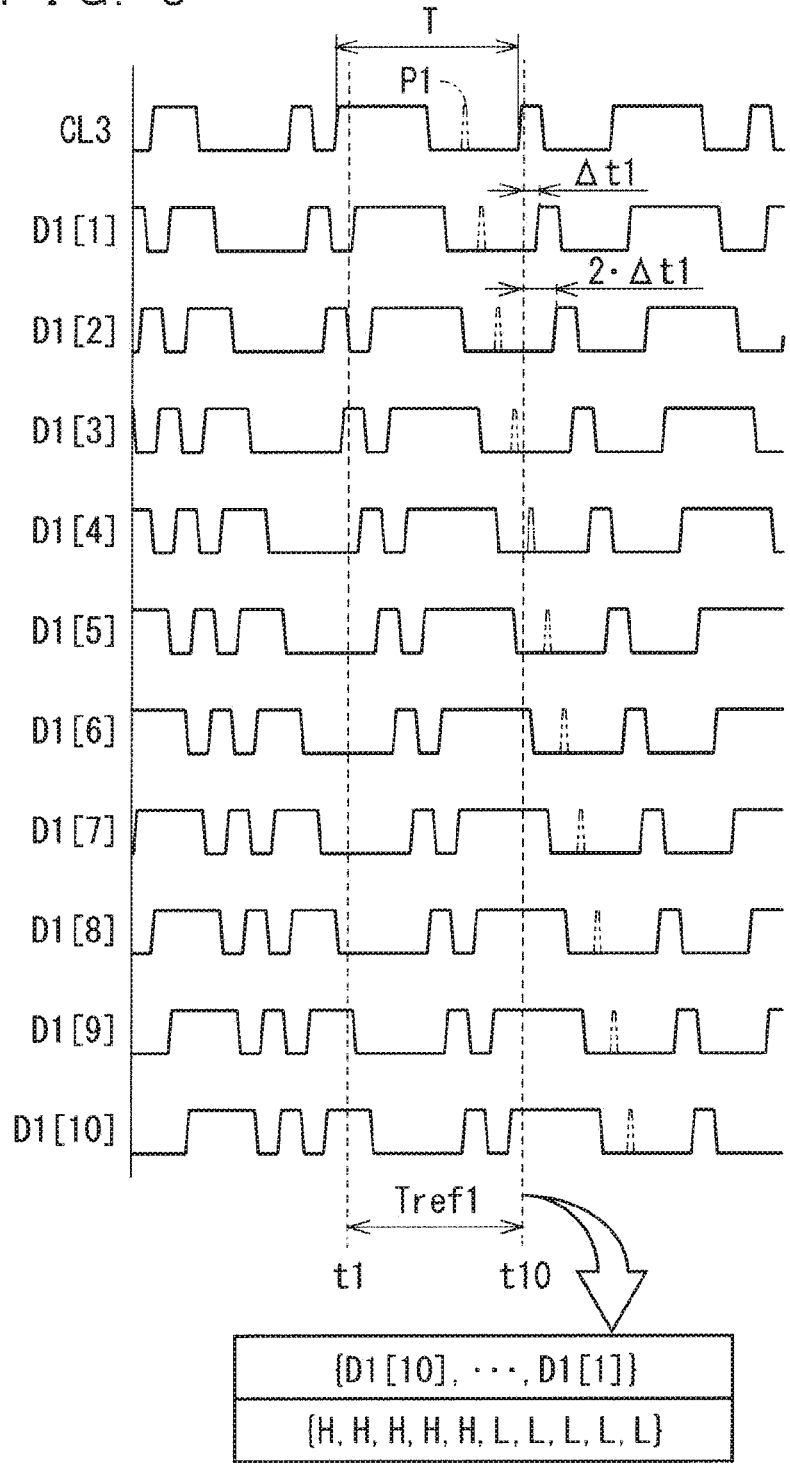
FIG. 8 is a drawing schematically illustrating an example of a clock signal and an output signal of a delay element.

FIG. 8 is a drawing illustrating an example of the clock signal CL3 and signals D1[1] to D1[10] each being output from the ten delay elements 131. In the example in FIG. 8, in a point of time t10 when the clock signal CL3 rises, the signals D1 [10] to D1 [1] are H, H, H, H, H, L, L, L, L, and L, respectively.

The following condition needs to be satisfied to determine that the cycle T, which has the point of time t10 at which the clock signal CL3 rises as a time of termination, is longer than the reference value Tref1. The condition indicates that a total number of transitions of H/L of the clock signal CL3 is equal to or smaller than one in a period from the point of time t1, which is earlier than the point of time t10 by the reference value Tref1, to the point of time t10.

In the example in FIG. 8, the signals D1 [10] to D1 [6] are H, and the signals D1 [5] to D1 [1] are L. That is to say, the change of H/L occurs just once in the signals D1 [6] and D1 [5]. This indicates that the clock signal CL3 transitions once in a period from the point of time t1 to the point of time t10.

The predetermined time $\Delta t1$ is set to be smaller than the minimum values THmin and TLmin as described above. Conversely, the minimum value THmin of the pulse width and the minimum value TLmin of the width between the pulses are set to be larger than the predetermined time $\Delta t1$. Thus, in the signal patterns of the signals D1 [10] to D1 [1], the number of transitions of the clock signal CL3 in the period from the point of time t1 to the point of time t10 appropriately appears.

When the clock signal CL3 is constantly L in the period from the point of time t1 to the point of time t10, all of the signals D1 [10] to D1 [1] are L. That is to say, the number of transitions of the clock signal CL3 in the period is zero. The cycle T at this time is also longer than the reference value Tref1.

As described above, when the number of transitions of H/L in the signal patterns of signals D1 [10] to D1 [1] is equal to or smaller than one, the cycle T is larger than the reference value Tref1, and when the number of transitions is equal to or larger than two, the cycle T is smaller than the reference value Tref1. FIG. 9 illustrates the signal patterns of the signals D1 [10] to D1 [1] in the case where the cycle T is larger than the reference value Tref1. In these signal patterns, the number of transitions of H/L is equal to or smaller than one. These signal patterns are referred to as reference patterns hereinafter. The plurality of the reference patterns constitute a pattern group covering signal patterns in the case where the cycle T is larger than the reference value Tref1. Specifically, the reference patterns are made up of digits, number of which is equal to the number N1 (ten herein), and the transition timing of H/L deviates one by one in a first reference pattern to a ninth reference pattern. All of the digits show L in the tenth reference pattern. As a more general description, in a $m^{th}$ {m indicates a natural number of 1 to (N1−1)} reference pattern, the first to $m^{th}$ digits show L, and $(m+1)^{th}$ to $(N1)^{th}$ digits show H. All of the digits show L in the $(N1)^{th}$ reference pattern.

With reference to FIG. 6, the cycle determination circuit 132 determines whether or not the signal patterns of the signals D1 [10] to D1 [1] coincide with one of the plurality of the reference patterns, and outputs a determination result J1 thereof to the synchronous circuit 133. The determination result J1 is indicated by H/L of an electrical signal. Herein, the determination result J1 shows H when the signal patterns coincide with one of the reference patterns, and the shows L when the signal patterns differ from all of the reference patterns. The cycle determination circuit 132 may be made up of a logic circuit, for example.

The clock signal CL3 is also input to the synchronous circuit 133. The synchronous circuit 133 detects a rising edge of the clock signal CL3, for example, and outputs the length information L1 [t] of the cycle T having the edge as a time of termination in accordance with the determination result J1 when the edge is detected. Specifically, when the determination result J1 shows H, the synchronous circuit 133 outputs "1" as the length information L1 [t], and when the determination result J1 shows L, the synchronous circuit 133 outputs "0 (zero)" as the length information L1 [t]. Herein, H/L is mainly used as the determination result, and "1" and "0 (zero)" are mainly used as the length information, however, they have in common that they are binary information, thus there is no particular difference between "H" and "1". The same also applies to "L" and "0 (zero)".

Considering that the determination result J1 may change at the time of detecting the edge, the synchronous circuit 133 may output the determination result J1 as the length information L1 [t] when the determination result J1 is stable over a predetermined stable period.

The pattern storage 14 outputs the length information L1 [t] to the determiner 12 without change and stores the length information L1 [t] for the unit period TP, and outputs the stored length information L1 [t] as the length information L1 [t-8] after a lapse of the unit period TP. The pattern storage 14 includes a shift register 141, for example. The clock signal CL3 is also input to the shift register 141. The shift register 141 may be made up of flip-flop circuits whose total number of stages is equal to a cycle number of the unit period TP (eight, herein), for example. Such a shift register 141 shifts data to a subsequent flip-flop circuit every time the clock signal CL3 is input (the rising edge, for example), thereby outputting the length information L1 [t-8] which is earlier by the unit period TP. The pieces of length information L1 [t] and L1 [t-8] correspond to the pieces of the length information of the cycle in the same order (position) in the unit periods TP1 and TP2, respectively.

With reference to FIG. 7, the determiner 12 determines whether or not the pieces of the length information L1 [t] and L1 [t-8] coincide with each other in Step S2 subsequent to Step S1. In the example in FIG. 6, the determiner 12 includes an exclusive negative OR (EX-NOR) unit 121, and the determination in Step S2 is substantially performed by the EX-NOR unit 121. The EX-NOR unit 121 includes an EX-NOR circuit, outputs "1" when the pieces of the length information L1 [t] and L1 [t-8] coincide with each other, and outputs "0 (zero)" when the pieces of the length information L1 [t] and L1 [t-8] do not coincide with each other. Information being output by the EX-NOR unit 121 is also referred to as coinciding/non-coinciding information M1 hereinafter.

With reference to FIG. 7, the determiner 12 executes Step S4 described hereinafter when the pieces of the length information L1 [t-8] and L1 [t] do not coincide with each other in Step S2. When the pieces of the length information L1 [t-8] and L1 [t] coincide with each other in Step S2, the determiner 12 increments a value CT2 in Step S3, and executes Step S4 described hereinafter. The determiner 12 can count the number of cycle groups (the coinciding number) in which the pieces of the length information L1 [t-8] and L1 [t] coincide with each other as the value CT2 through the processing described above. Thus, the value CT2 for each unit period TP indicates the similarity ratio between the pieces of the pattern information in the unit period TP and the immediately preceding unit period TP.

In the example in FIG. 6, the determiner 12 includes a counter 123, and the coinciding/non-coinciding information M1 and the clock signal CL3 are input to the counter 123. The counter 123 integrates a value of the coinciding/non-coinciding information M1 for each cycle of the clock signal CL3 (for example, the rising edge), and outputs a result thereof as the count value CT2. That is to say, the counter 123 increments the count value CT2 when the pieces of the length information L1 [t-8] and L1 [t] coincide with each other. The determiner 12 initializes the count value CT2 of the counter 123 to zero every time the unit period TP passes.

With reference to FIG. 7, the determiner 12 determines whether or not the unit period TP has passed in Step S4, and when the unit period TP has not passed, the cycle determiner 13 executes Step S1 again, and when the unit period TP has passed, the determiner 12 determines whether or not the count value CT2 (the similarity ratio) is higher than the similarity ratio reference value (for example, six) in Step S5. In the example in FIG. 6, the determiner 12 includes a counter 122 and a comparison circuit 124, and the counter 122 and the comparison circuit 124 substantially execute the determination in Steps S4 and S5.

The counter 122 counts the cycle number of the clock signal CL3, and outputs the count value CT1 to the comparison circuit 124. For example, the counter 122 increments the count value CT1 for each rise of the clock signal CL3. When a count amount of the counter 122 coincides with the cycle number of the unit period TP, the unit period TP is considered to have passed. That is to say, the counter 122 functions as a timer for detecting a lapse of the unit period TP. The determiner 12 initializes the count value CT1 of the counter 122 every time the unit period TP passes.

The count value CT1 from the counter 122 and the count value CT2 from the counter 123 are input to the comparison circuit 124. When the count amount of the counter 122 coincides with the cycle number of the unit period TP, the comparison circuit 124 compares the magnitude relationship between the count value CT2 (the similarity ratio) and the similarity ratio reference value, and outputs a comparison result thereof as the determination result J2 to the function control device 2. The determination result J2 is indicated by H/L of an electrical signal. For example, when the similarity ratio is higher than the similarity ratio reference value, the determination result J2 shows H, and when the similarity ratio is equal to or smaller than the similarity ratio reference value, the determination result J2 shows L. That is to say, the determination result J2 taking H indicates that the clock signal CL3 is the illegal unexpected clock signal CL2, and the determination result J2 taking L indicates that the clock signal CL3 is the normal expected clock signal CL1.

When the determiner 12 determines that the count value CT2 (the similarity ratio) is equal to or smaller than the similarity ratio reference value in Step S5, the determiner 12 initializes the timer for counting the unit period TP (that is to say, the count value CT1) and the similarity ratio (that is to say, the count value CT2) in Step S7, and the cycle determiner 13 executes Step S1 again. When the count value CT2 (the similarity ratio) is higher than the similarity ratio reference value in Step S5, the function control device 2 restricts the operation of the processing device 3 in Step S6.

As described above, when the clock signal CL3 is the unexpected clock signal CL2, the clock determination apparatus 1 can detect it. In addition, according to the clock determination apparatus 1, the pieces of the information in accordance with the waveforms of the clock signals CL3 in the unit periods TP made up of the plurality of cycles are compared to determine whether the clock signal CL3 is the expected clock signal CL1 or the unexpected clock signal CL2.

Considered herein is a case of comparing two cycles in the clock signal CL3, differing from the clock determination apparatus 1. For example, it is considered that the clock signal CL3 is determined to be the expected clock signal CL1 when the length of a certain cycle of the clock signal CL3 is different from the immediately preceding cycle. However, even in a case of the unexpected clock signal CL2 (the regular clock signal CLb), the cycle of the unexpected clock signal CL2 may change due to noise, for example, thus the determination based on the two cycles is less-accurate.

In contrast, according to the clock determination apparatus 1, the pieces of the information in accordance with the waveforms of the clock signals CL3 in the unit periods TP made up of the plurality of cycles are compared. Thus, it can be determined with a higher degree of accuracy whether the clock signal CL3 is the random clock signal CLa (herein the expected clock signal CL1) or the regular clock signal CLb (herein the unexpected clock signal CL2).

In the example described above, when the clock signal CL3 is determined to be the unexpected clock signal CL2, the operation of the processing device 3 is restricted. Thus, even if the third party inputs the unexpected clock signal CL2 to the information processing device 10 in place of the expected clock signal CL1, a benefit which the third party can acquire can be reduced.

In the example described above, the length determination of each cycle is performed using the plurality of the delay elements 131. The accuracy of the delay time of the delay element 131 only needs to be lower than the predetermined time Δt1, thus needs not be so high. Thus, the delay element 131 can be made at low cost. The delay element 131 does not need a clock signal different from the clock signal CL3 for performing the delay operation. Accordingly, a manufacturing cost and a scale of the circuit can be reduced.

The similarity ratio may be high by chance even in a case where the clock signal CL3 is the expected clock signal CL1 (the random clock signal CLa). At this time, the determiner 12 has a possibility of erroneously determining that the clock signal CL3 is the unexpected clock signal CL2. Effective to reduce the possibility is that the number of cycles (the cycle number) constituting the unit period TP is set to be large or the similarity ratio reference value is set to be high, for example. More specifically, probability that the similarity ratio of the expected clock signal CL1 is higher than the similarity ratio reference value is $1/64$ when (the cycle number of unit period TP and the similarity ratio reference value) is (8 and 6), $1/256$ in a case of (10 and 8), $1/16384$ in a case of (16 and 14), and $1/4000000$ in a case of (20 and 18).

<Edge of Clock Signal CL3>

In the example described above, the synchronous circuit 133 detects the rising edge of the clock signal CL3, thus the signal pattern in accordance with the rising edge is adopted as the reference pattern (FIG. 9). However, the synchronous circuit 133 does not necessarily detect the rising edge, but may detect a falling edge. In this case, a reference pattern in accordance with the falling edge may be adopted. Specifically, a pattern indicated by switching H/L in the reference pattern in FIG. 9 is the reference pattern in accordance with the falling edge. As a more general description, in a $m^{th}$ reference pattern, the first to $m^{th}$ digits show H, and $(m+1)^{th}$ to $(N1)^{th}$ digits show L. All of the digits show H in the $(N1)^{th}$ reference pattern. In this case, the counters 122 and 123 perform the count operation in accordance with the falling of the clock signal CL3.

<Expected Clock Signal/Unexpected Clock Signal>

In the example described above, when the processing device 3 executes the confidential processing, the clock generation device 20 outputs the random clock signal CLa. Thus, at this time, the random clock signal CLa is the expected clock signal CL1. In the example described above, the illegal clock generation device 20' outputs the regular clock signal CLb, thus the regular clock signal CLb is the unexpected clock signal CL2.

In the meanwhile, when the processing device 3 executes the normal processing, the clock generation device 20 outputs the regular clock signal CLb. Thus, at this time, the regular clock signal CLb is the expected clock signal CL1. Considered herein is a case where the illegal third party inputs the random clock signal CLa to the information processing device 10 using the illegal clock generation device 20'. In this case, the random clock signal CLa is the unexpected clock signal CL2. The operation based on such an unexpected clock signal CL2 from the illegal clock generation device 20' is not preferable, thus the clock determination apparatus 1 preferably detects the random clock signal CLa as the unexpected clock signal CL2.

That is to say, a definition of the expected clock signal CL1 and the unexpected clock signal CL2 differs in accordance with a processing content of the processing device 3. Thus, it is also applicable that the clock determination apparatus 1 receives the information of the processing content of the processing device 3, and switches the definition of the expected clock signal CL1 and the unexpected clock signal CL2 in accordance with the information. For example, request signals RD11 and RD 2 being output from the processing device 3 to the clock generation device 20 may be input to the determiner 12 of the clock determination apparatus 1 (also refer to FIG. 1). When the processing device 3 performs the confidential processing, the determiner 12 outputs the determination result J2 to the function control device 2 without change, and when the processing device 3 performs the normal processing, the determiner 12 inverts H/L of the determination result J2 and outputs it to the function control device 2.

Accordingly, when the processing device 3 performs the confidential processing, the clock determination apparatus 1 can detects the regular clock signal CLb as the unexpected clock signal CL2, and when the processing device 3 performs the normal processing, the clock determination apparatus 1 can detect the random clock signal CLa as the unexpected clock signal CL2.

<Implementation Period of Determination Processing>

The determination processing of the clock signal CL3 in the normal processing is described above, however, there may be less need to restrict the operation of the processing device 3 in the normal processing. That is to say, in order to reduce the possibility of leaking the confidential information, the determination of the clock signal only needs to be performed when the processing device 3 executes the confidential processing, and the determination of the clock signal needs not be necessarily performed in the normal processing. Thus, in this case, the clock determination apparatus 1 may perform the determination of the clock signal when the processing device 3 executes the confidential processing, and does not need perform the determination of the clock signal when the processing device 3 executes the normal processing. In other words, the clock determination apparatus 1 may perform the determination processing of the clock signal only when the processing device 3 requests the random clock signal CLa. Accordingly, the determination can be executed only when there is a great need, thus the unnecessary determination can be avoided.

When the clock signal CL3 is determined to be the unexpected clock signal CL2 during the execution of the confidential processing, the processing device 3 may stop the confidential processing and perform the normal processing. It is because the leakage of the confidential information can be prevented also according to the above manner.

Described hereinafter is a case where the processing device 3 representatively performs the confidential processing. When the processing device 3 performs the normal processing, it is applicable in the description hereinafter to switch the expected clock signal CL1 and the unexpected clock signal CL2 to the regular clock signal CLb and the random clock signal CLa, respectively.

<Plurality of Unit Periods TP>

In the example described above, the waveforms of the clock signals CL3 in the two unit periods TP1 and TP2 are compared with each other. However, the waveforms of the clock signals CL3 in three or more unit periods TP may be compared with each other. Specifically, it is also applicable that a similarity ratio between the waveforms of the clock signals CL3 in the three or more unit periods TP is calculated, and when the similarity ratio is higher than a similarity ratio reference value, the clock signal CL3 is determined to be the unexpected clock signal CL2, and when the similarity ratio is lower than the similarity ratio reference value, the clock signal CL3 is determined to be the expected clock signal CL1.

Adopted herein as an example is a total number of cycle groups each having the length information of the cycle in the same order (position) coinciding with each other in the three unit periods TP as the similarity ratio. FIG. 10 illustrates an example of the pieces of the pattern information in the continuous three unit periods TP1 to TP3.

The unexpected clock signal CL2 is firstly described. The cycle of the unexpected clock signal CL2 is substantially constant, thus ideally speaking, all of the pieces of the length information of each cycle in the unit periods TP1 to TP3 coincide with each other. In the example in FIG. 10, all of the pieces of the length information indicate "1". Thus, the pieces of the length information of the cycles in all of the cycle groups in the unit periods TP1 to TP3 coincide with each other. Accordingly, the similarity ratio in the three unit periods TP1 to TP3 is the same as the similarity ratio in the two unit periods TP1 and TP2 (FIG. 5), that is eight.

The expected clock signal CL1 is described next. The cycle of the expected clock signal CL1 changes substantially irregularly, thus each cycle in the unit periods TP1 to TP3 substantially irregularly takes one of "1" and "0 (zero)". In the example in FIG. 10, the pieces of the length information of the cycles in the first cycle groups in the unit periods TP1 to TP3 coincide with each other, however, in the other cycle groups, one of the pieces of the length information of the three periods is different from the other two. Thus, the similarity ratio is 1 at this time, and is lower than the similarity ratio (=4) illustrated in FIG. 5. It is because probability that the pieces of the length information of the cycle in the same order (position) in the three unit periods TP coincide with each other is lower than probability that the pieces of the length information of the cycle in the same order (position) in the two unit periods TP coincide with each other.

As described above, in the unexpected clock signal CL2, the similarity ratio in the three unit periods TP is as high as the similarity ratio in the two unit periods TP, however, the expected clock signal CL1 has high probability that the similarity ratio in the three unit periods TP is lower than the similarity ratio in the two unit periods TP. That is to say, the probability that the similarity ratio in the expected clock signal CL1 is higher than the similarity ratio reference value can be reduced while keeping the similarity ratio in the unexpected clock signal CL2 to be higher than the similarity ratio reference value. Thus, the possibility of erroneously determining the clock signal CL3 can be reduced. In other words, the accuracy of the determination processing of the clock signal CL3 can be enhanced.

Moreover, the number of cycles constituting the unit period TP needs not be increased, thus the determination processing of the clock signal CL3 can be executed more rapidly. That is to say, the determination of the clock signal CL3 is performed for each unit period TP. Thus, if the number of cycles constituting the unit period TP is increased, the time required to determine the clock signal CL3 is increased, however, if the waveforms of the clock signals CL3 in the three or more unit periods TP are compared with each other, the number of cycles constituting the unit period TP needs not be increased. Thus, the determination processing of the clock signal CL3 can be executed more rapidly.

Figure 11:
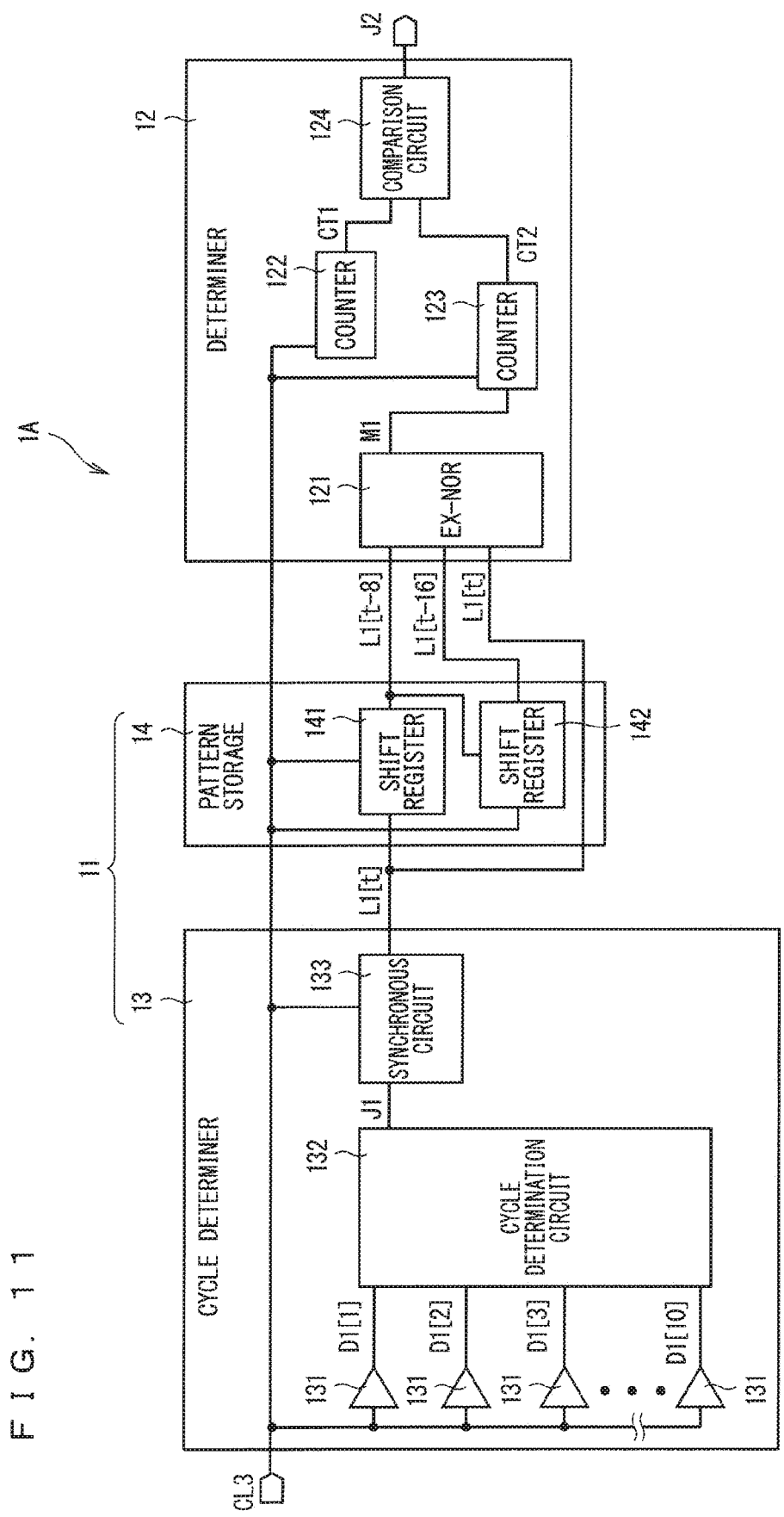
FIG. 11 is a drawing schematically illustrating an example of an inner configuration of a clock determination apparatus.

FIG. 11 schematically illustrates an example of a configuration of a clock determination apparatus 1A performing the determination described above. The clock determination apparatus 1A differs from the clock determination apparatus 1 in a configuration of the pattern storage 14 and a configuration of the EX-NOR unit 121.

The pattern storage 14 includes not only the shift register 141 but also a shift register 142. The length information L1 [t-8] is input from the shift register 141 to the shift register 142, and the clock signal CL3 is also input to the shift register 142. The shift register 142 has a configuration similar to the shift register 141, stores the length information L1 [t-8] for the unit period TP, and outputs the stored length information L1 [t-8] as length information L1 [t-16] to the determiner 12 (more specifically, the EX-NOR unit 121) after a lapse of the unit period TP. The pieces of the length information L1 [t], L1 [t-8], and L1 [t-16] correspond to the pieces of the length information of the cycle in the same order (position) in the three continuous unit periods TP1 to TP3.

When the pieces of the length information L1 [t], L1 [t-8], and L1 [t-16] coincide with each other, the EX-NOR unit 121 outputs "1" as the coinciding/non-coinciding information M1, and when the pieces of the length information L1 [t], L1 [t-8], and L1 [t-16] differ from the other two, the EX-NOR unit 121 outputs "0 (zero)" as the coinciding/non-coinciding information M1. That is to say, when the length information of the $n^{th}$ cycle in the unit period TP3, the length information of the $n^{th}$ cycle in the immediately previous unit period TP2, and the length information of the $n^{th}$ cycle in the immediately previous unit period TP1 coincide with each other, the coinciding/non-coinciding information M1 takes "1", and in the other case, the coinciding/non-coinciding information M1 takes "0 (zero)". The EX-NOR unit 122 is made up of a logic circuit, for example.

The counter 123 performs the count operation in synchronization with the clock signal CL3, and increments the count value CT2 when the coinciding/non-coinciding information M1 takes "1". The count value CT2 indicates the number of cycle groups each having the length information of the cycle in the same order (position) coinciding with each other in the three unit periods TP (the coinciding number).

The comparison circuit 124 compares the count value CT2 with the similarity ratio reference value for each unit period TP, and outputs the comparison result as the determination result J2. The count value CT2 in the state where the unit period TP has passed indicates the similarity ratio, thus the comparison circuit 124 compares the similarity ratio and the similarity ratio reference value.

<Pattern Information>

In the example described above, the length information is the binary information indicating whether the cycle is long or short. Accordingly, the length information can be easily generated. However, the length information may be multi-valued information. For example, the length information may be ternary information indicating whether the cycle is long, medium, or short. Accordingly, the probability that the pieces of the length information of the cycles in the same order (position) in the plurality of the unit periods TP coincide with each other is reduced in the expected clock signal CL1, thus the possibility of erroneously determining the clock signal CL3 to be the unexpected clock signal CL2 can be reduced.

Second Embodiment

Figure 12:
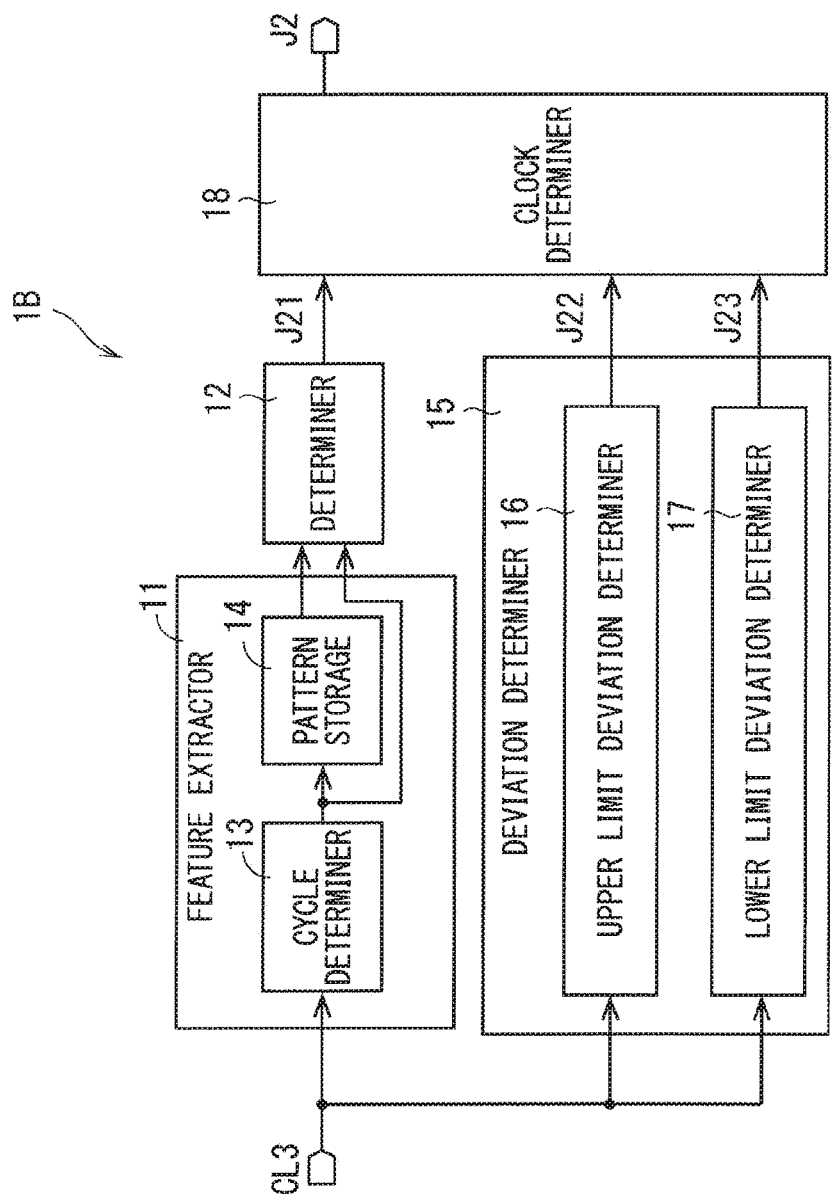
FIG. 12 is a drawing schematically illustrating an example of an inner configuration of a clock determination apparatus.

FIG. 12 is a drawing schematically illustrating an example of a configuration of a clock determination apparatus 1B. The clock determination apparatus 1B differs from the clock determination apparatus according to the first embodiment in the presence or absence of a deviation determiner 15 and a clock determiner 18.

The operations of the feature extractor 11 and the determiner 12 are as described above. However, the determination result being output by the determiner 12 is referred to as a determination result J21.

The deviation determiner 15 determines whether or not each cycle of the clock signal CL3 is within the allowable range, and outputs a determination result thereof to the clock determiner 18. Specifically, the deviation determiner 15 includes an upper limit deviation determiner 16 and a lower limit deviation determiner 17.

The upper limit deviation determiner 16 determines whether or not each cycle of the clock signal CL3 is longer than an upper limit Tmax (for example, 60 [ns]) of the allowable range of the expected clock signal CL1, and outputs a determination result J22 thereof to the clock determiner 18. The determination result J22 is indicated by H/L of an electrical signal. For example, when the cycle is longer than the upper limit Tmax, the determination result J22 shows H, and when the cycle is shorter than the upper limit Tmax, the determination result J22 shows L.

Figure 13:
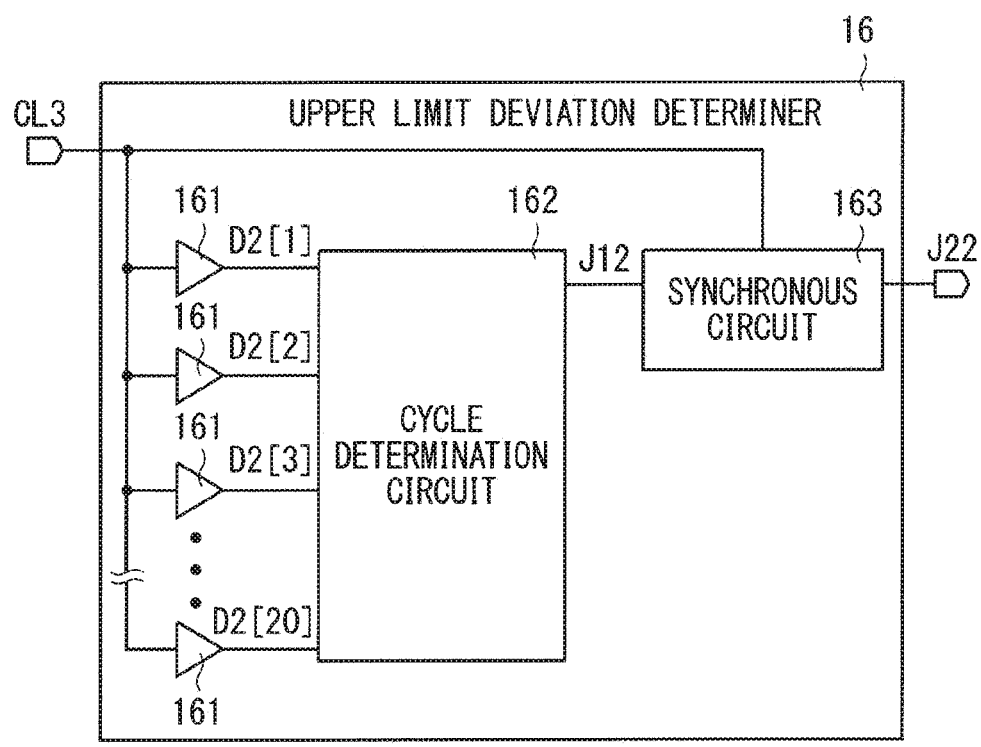
FIG. 13 is a drawing schematically illustrating an example of an inner configuration of an upper limit deviation determiner.

FIG. 13 is a drawing schematically illustrating an example of a specific inner configuration of the upper limit deviation determiner 16. In the example in FIG. 13, the upper limit deviation determiner 16 includes a plurality of delay elements 161, a cycle determination circuit 162, and a synchronous circuit 163.

The clock signal CL3 is input to the plurality of the delay elements 161. The plurality of the delay elements 161 delays the clock signal CL3 with delay times different from each other in the manner similar to the delay elements 131. In the example in FIG. 13, the plurality of the delay elements 161 are arranged side by side. An order in accordance with an arrangement order is introduced hereinafter for a purpose of description. A first delay element 161 means a delay element 161 arranged at a front of the arrangement order.

The delay time of a $y^{th}$ delay element 161 is set to a product of a predetermined time $\Delta t2$ and y ($y \cdot \Delta t2$), for example. That is to say, a difference between the delay times of the delay elements 161 is set to the predetermined time $\Delta t2$. The predetermined time $\Delta t2$ is set to 3 [ns], for example, on a condition similar to the predetermined time $\Delta t1$. A number N2 of the delay element 161 is set so that a product of the number N2 and the predetermined time $\Delta t2$ ($\Delta t2 \cdot N2$) is equal to or larger than the upper limit Tmax of the allowable range (for example, 60 [ns]), and is set to 20, for example. The output signal of the $y^{th}$ delay element 161 is also referred to as the signal D2 [y] hereinafter. When the output signals of the several delay elements 161 are the same as the output signals of the several delay elements 131, they may double as each other. For example, the signals D2 [1] to D2 [10] of the first to tenth delay elements 161 are the same as the signals D1 [1] to D1 [10] of the first to tenth delay elements 131, thus they may double as each other. Accordingly, the number of delay elements can be reduced.

The signals D2 [1] to D2 [20] are input from the twenty delay elements 161 to the cycle determination circuit 162. A plurality of the reference patterns in a case where the cycle is longer than the upper limit Tmax are previously stored in the cycle determination circuit 162. The reference patterns can be set in the manner similar to the reference pattern of the cycle determination circuit 132, thus a specific example thereof is omitted. The cycle determination circuit 162 determines whether or not the signal patterns of the signals D2 [20] to D2 [1] coincide with one of the plurality of the reference patterns, and outputs a determination result J12 thereof to the synchronous circuit 163. The determination result J12 is indicated by H/L of an electrical signal. For example, the determination result J12 shows H when the signal pattern coincides with one of the reference patterns, and the determination result J12 shows L when the signal pattern does not coincide with any of the reference patterns.

The clock signal CL3 is also input to the synchronous circuit 163. In the manner similar to the synchronous circuit 133, the synchronous circuit 163 detects a rising edge of the clock signal CL3, for example, and outputs, to the clock determiner 18, the determination result J12 of the cycle determination circuit 162 at the time of detecting the rising edge as the determination result J22. The determination result J22 shows H when the cycle having the detected rising edge as a time of termination is longer than the upper limit Tmax, and shows L when the cycle is shorter than the upper limit Tmax.

With reference to FIG. 12, the lower limit deviation determiner 17 determines whether or not each cycle of the clock signal CL3 is shorter than the lower limit Tmin of the allowable range of the expected clock signal CL1 (for example, 10 [nm]), and outputs a determination result J23 thereof to the clock determiner 18. The determination result J23 is indicated by H/L of an electrical signal. For example, when the cycle is shorter than the lower limit Tmin, the determination result J23 shows H, and when the cycle is longer than the lower limit Tmin, the determination result J23 shows L.

However, even in the case of the expected clock signal CL1, the cycle may instantaneously be shorter than the lower limit Tmin due to noise, for example. That is to say, even when only one cycle of the clock signal CL3 is lower than the lower limit Tmin, it is premature to determine that the clock signal CL3 is the unexpected clock signal CL2. Thus, it is applicable that the lower limit deviation determiner 17 determines whether or not the number of cycles shorter than the lower limit Tmin in a first predetermined period (for example, the unit period TP) is larger than a predetermined first number reference value, and determines that the cycle of the clock signal CL3 is shorter than the lower limit Tmin when the number of cycles is larger than the first number reference value. The first number reference value is previously set, for example.

Figure 14:
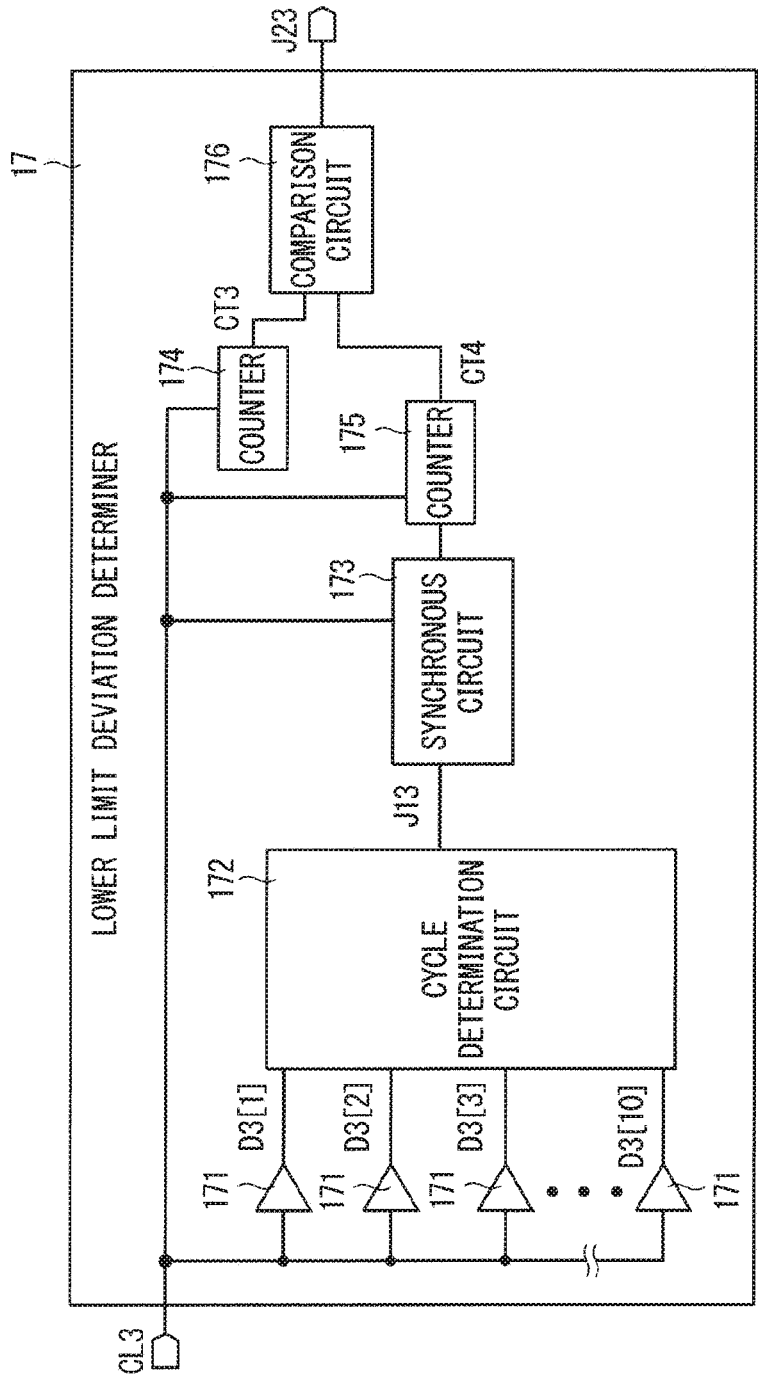
FIG. 14 is a drawing schematically illustrating an example of an inner configuration of a lower limit deviation determiner.

FIG. 14 is a drawing schematically illustrating an example of a specific inner configuration of the lower limit deviation determiner 17. In the example in FIG. 14, the lower limit deviation determiner 17 includes a plurality of delay elements 171, a cycle determination circuit 172, a synchronous circuit 173, counters 174 and 175, and a comparison circuit 176.

The clock signal CL3 is input to the plurality of the delay elements 171. The plurality of the delay elements 171 delays the clock signal CL3 with delay times different from each other in the manner similar to the delay elements 131 and 161. In the example in FIG. 14, the plurality of the delay elements 171 are arranged side by side. An order in accordance with an arrangement order is introduced hereinafter for a purpose of description. A first delay element 171 means a delay element 171 arranged at a front of the arrangement order.

The delay time of a $z^{th}$ delay element 171 is set to a product of a predetermined time $\Delta t3$ and z ($z \cdot \Delta t3$), for example. In other words, a difference between the delay times of the delay elements 171 is set to the predetermined time $\Delta t3$. The predetermined time $\Delta t3$ is set on a condition similar to the predetermined times $\Delta t1$ and $\Delta t2$, however, the cycle shorter than the lower limit Tmin is assumed to be detected herein, thus the predetermined time Δt3 is set to be smaller than the predetermined times Δt1 and Δt2, and is set to 1 [ns], for example.

A number N3 of the delay element 171 is set so that a product of the number N3 and the predetermined time Δt3 (N3·Δt3) is equal to or larger than the lower limit Tmin of the allowable range of the clock signal CL1 (for example, 10 [ns]), and is set to 10, for example. The output signal of the $z^{th}$ delay element 171 is also referred to as the signal D3 [z] hereinafter. When the output signals of the several delay elements 171 are the same as the output signals of the several delay elements 131 (or the several delay elements 161), they may double as each other. For example, the signals D3 [3], D3 [6], and D3 [9] of the third, sixth, and ninth delay elements 171 are the same as the signals D1 [1] to D1 [3] of the first to third delay elements 131, thus they may double as each other.

The signals D3 [1] to D3 [10] are input from the ten delay elements 171 to the cycle determination circuit 172. A plurality of the reference patterns in a case where the cycle is longer than the lower limit Tmin are previously stored in the cycle determination circuit 172. The reference patterns can be set in the manner similar to the reference pattern of the cycle determination circuit 132, thus a specific example thereof is omitted. The cycle determination circuit 172 determines whether or not the signal patterns of the signals D3 [10] to D3 [1] coincide with one of the plurality of the reference patterns, and outputs a determination result J13 thereof to the synchronous circuit 173. The determination result J13 is indicated by H/L of an electrical signal. For example, when the signal pattern coincides with one of the reference patterns, the cycle is longer than the lower limit Tmin, thus the determination result J13 shows L, and when the signal pattern does not coincide with any of the reference patterns, the cycle is shorter than the lower limit Tmin, thus the determination result J13 shows H.

The clock signal CL3 is also input to the synchronous circuit 173. In the manner similar to the synchronous circuit 133, the synchronous circuit 173 detects a rising edge of the clock signal CL3, for example, and outputs, to the counter 175, the determination result J13 of the cycle determination circuit 172 at the time of detecting the rising edge.

The clock signal CL3 is also input to the counter 175. The counter 175 performs the count operation in synchronization with the clock signal CL3 in the manner similar to the counter 123, and counts a total number of the determination results J13 showing H being output from the synchronous circuit 173. Thus, a count value CT4 of the counter 175 indicates the number of cycles shorter than the lower limit Tmin. The counter 175 outputs the count value CT4 to the comparison circuit 176. The count value CT4 is initialized every time the first predetermined period has passed.

The clock signal CL3 is input to the counter 174. The counter 174 counts the cycle number of the clock signal CL3 in the manner similar to the counter 122, and outputs the count value CT3 to the comparison circuit 176. The counter 174 functions as a timer for detecting a lapse of the first predetermined period. Herein, the first predetermined period is regulated by a predetermined cycle number of the clock signal CL3. The first predetermined period may be the same as or different from the unit period TP.

The comparison circuit 176 detects the lapse of the first predetermined period based on the count value CT3, and compares the count value CT4 in the state where the unit period TP has passed and the first number reference value. Then, the comparison circuit 176 outputs the comparison result as the determination result J23 to the clock determiner 18. The count value CT4 in the state where the first predetermined period has passed indicates the number of cycles shorter than the lower limit Tmin in the first predetermined period. The determination result J23 shows H when the number of cycles is larger than the first number reference value, and shows L when the number of cycles is smaller than the first number reference value.

The clock determiner 18 determines whether the clock signal CL3 is the expected clock signal CL1 or the unexpected clock signal CL2 based on the determination results J21 to J23. Specifically, in the manner similar to the first embodiment, the clock determiner 18 determines that the clock signal CL3 is the unexpected clock signal CL2 when the waveforms of the clock signals CL3 in the plurality of the unit periods TP coincide with (or similar to) each other. Furthermore, the clock determiner 18 determines that the clock signal CL3 is the unexpected clock signal CL2 also when the cycle of the clock signal CL3 is out of the allowable range (that is to say, when the cycle is larger than the upper limit Tmax or the cycle is shorter than the lower limit Tmin).

In the meanwhile, the clock determiner 18 determines that the clock signal CL3 is the expected clock signal CL1 when the waveforms of the clock signals CL3 in the plurality of the unit periods TP do not coincide with (or are not similar to) each other and the cycle of the clock signal CL3 is within the allowable range. The clock determiner 18 outputs the determination result J2 thereof to the function control device 2.

The clock determiner 18 may include an OR circuit group. The determination results J21 to J23 are input to the OR circuit group. The OR circuit group outputs the determination result J2 showing H when at least one of the determination results J21 to J23 shows H, and outputs the determination result J2 showing L when all of the determination results J21 to J23 show L.

As described above, according to the second embodiment, it is determined that the clock signal CL3 is the unexpected clock signal CL2 not only when the waveforms of the clock signals CL3 in the plurality of the unit periods TP coincide with (or are similar to) each other but also when the cycle of the clock signal CL3 deviates from the allowable range. Thus, the operation of the processing device 3 can be restricted also when the clock signal CL3 having the cycle out of the allowable range is input.

When the cycle of the clock signal CL3 deviates from the allowable range, it can be determined that the clock signal CL3 is the unexpected clock signal CL2 regardless of the processing content of the processing device 3. That is to say, when the cycle of the clock signal CL3 deviates from the allowable range, it is determined that the clock signal CL3 is the unexpected clock signal CL2 regardless of whether the processing device 3 performs the confidential processing or the normal processing. That is to say, when the processing device 3 performs the normal processing, the determiner 12 inverts the determination result J2, and in the meanwhile, the deviation determiner 15 does not invert the determination results J22 and J23.

Third Embodiment

The cycle of the unexpected clock signal CL2 adopted by the illegal third party is unknown, and may accidentally have the same degree of value as the reference value Tref1. The cycle of the unexpected clock signal CL2 is substantially constant, but slightly changes actually. Thus, each cycle of the unexpected clock signal CL2 may be longer than or shorter than the reference value Tref1 due to the change. Thus, even when the clock signal CL3 is the unexpected clock signal CL2, the result of the determination of the length of each cycle in the plurality of the unit periods TP may be varied, and as a result, the pieces of the pattern information in the plurality of the unit periods TP may not be similar to each other. At this time, the clock signal CL3 is actually the unexpected clock signal CL2, but is erroneously determined to be the expected clock signal CL1.

Thus, intended in the third embodiment is that the clock signal CL3 is appropriately detected when the clock signal CL3 is the unexpected clock signal CL2 having substantially the same degree of constant cycle as the reference value Tref1.

Figure 15:
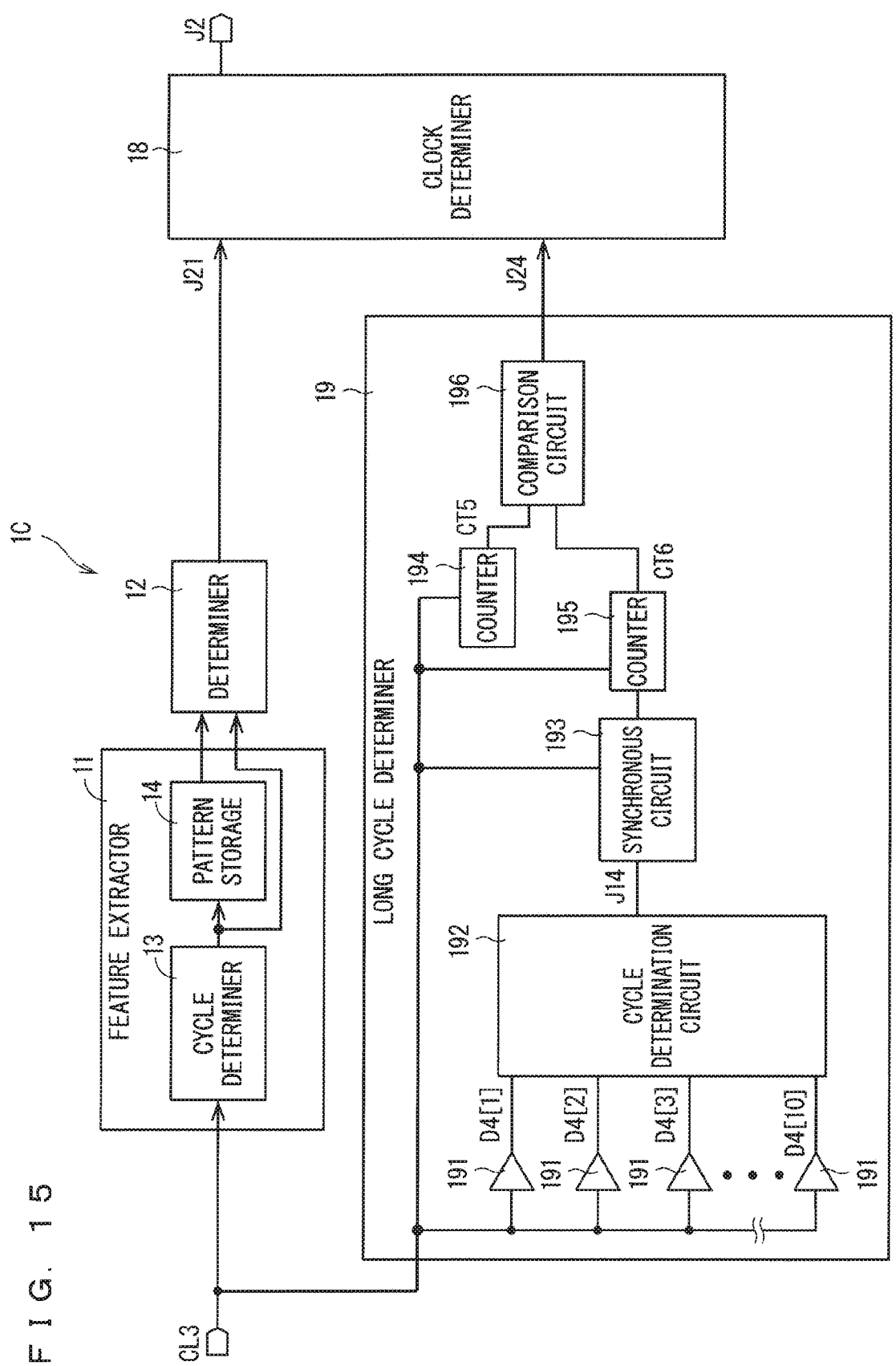
FIG. 15 is a drawing schematically illustrating an example of an inner configuration of a clock determination apparatus.

FIG. 15 is a drawing schematically illustrating an example of a configuration of a clock determination apparatus 1C. The clock determination apparatus 1C differs from the clock determination apparatus according to the first embodiment in the presence or absence of the clock determiner 18 and a long cycle determiner 19.

The determination processing of the clock signal is firstly outlined before describing each configuration of the clock determination apparatus 1C. The clock determination apparatus 1C does not immediately determine that the clock signal CL3 is the expected clock signal CL1 (the random clock signal CLa) when determining that the pieces of the pattern information of the clock signals CL3 in the plurality of the unit periods TP are not similar to each other, but determines that the clock signal CL3 is the expected clock signal CL1 when conditions described below are further satisfied.

Figure 16:
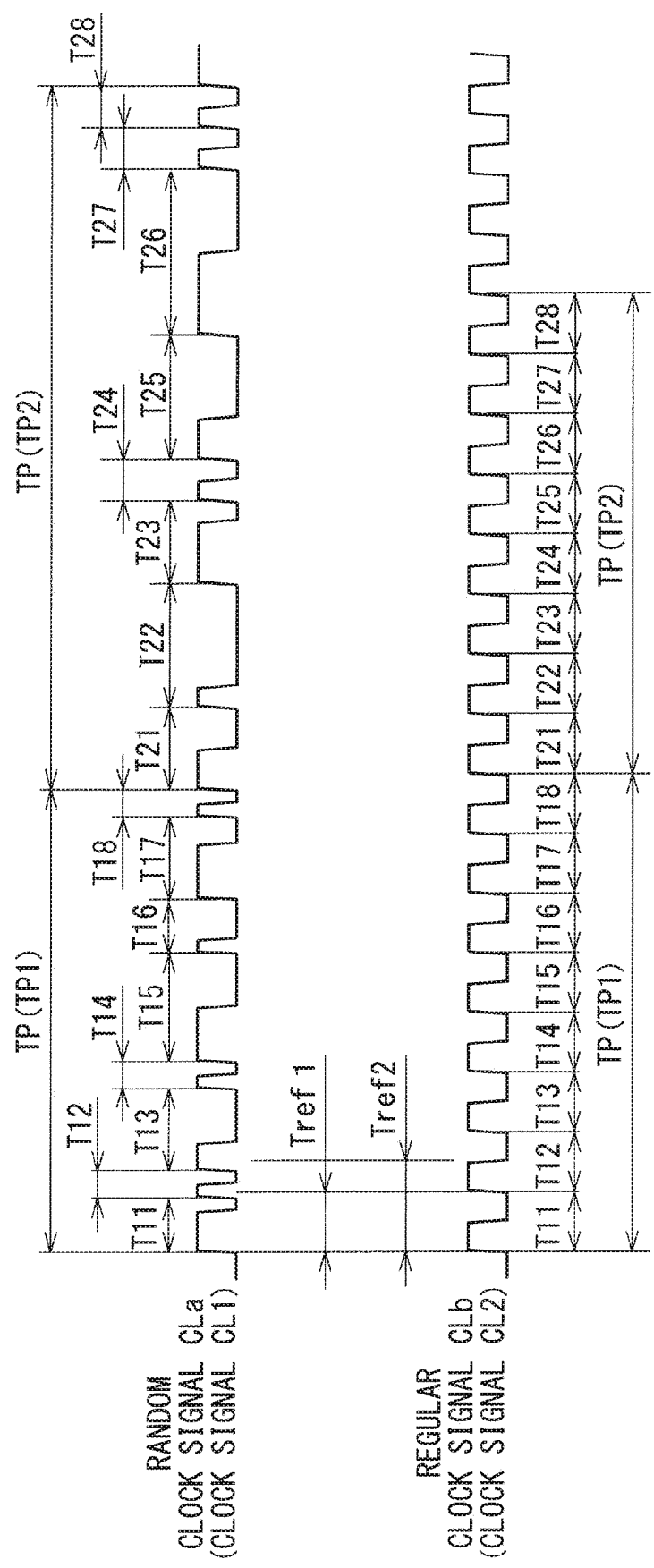
FIG. 16 is a drawing schematically illustrating an example of a clock signal.

Herein, attention is focused on the state where the fluctuation variation of the cycle of the unexpected clock signal CL2 (the regular clock signal CLb) is smaller than the fluctuation variation of the cycle of the expected clock signal CL1. FIG. 16 is a drawing illustrating an example of the random clock signal CLa (the expected clock signal CL1) and the regular clock signal CLb (the unexpected clock signal CL2). In the example in FIG. 16, the cycle of the unexpected clock signal CL2 is substantially the same as the reference value Tref1. Thus, even in the case of the unexpected clock signal CL2, the result of the determination of the length of the cycle using the reference value Tref1 is varied, and the pieces of the pattern information in the plurality of the unit periods TP are not similar to each other.

However, the cycle of the unexpected clock signal CL2 is substantially constant, thus does not take the value significantly deviating from the reference value Tref1. In the meanwhile, the cycle of the expected clock signal CL1 changes substantially irregularly within the allowable range, and may take the value significantly deviating from the reference value Tref1 in some cases. For example, in FIG. 16, the difference of the length of the cycle T15 and the reference value Tref1 is comparatively large.

Thus, in the third embodiment, a reference value Tref2 different from the reference value Tref1 is introduced. The difference between the reference values Tref1 and Tref2 may be appropriately set, but is set to be larger than the fluctuation variation of the cycle of the unexpected clock signal CL2 which is normally expected. The reference value Tref2 is naturally set to be within the allowable range of the cycle of the expected clock signal CL1.

Firstly described is a case where the reference value Tref2 is larger than the reference value Tref1 as illustrated in FIG. 16. The reference value Tref2 is set to 40 [ns], for example. When the cycle of the unexpected clock signal CL2 is substantially the same as the reference value Tref1, the cycle is not longer than the reference value Tref2 as illustrated in FIG. 16. In the meanwhile, the cycle of the expected clock signal CL1 changes substantially irregularly within the allowable range, thus may be longer than the reference value Tref2 in some cases. For example, the cycles T15 and T22, for example, are longer than the reference value Tref2. The cycle longer than the reference value Tref2 is referred to as the long cycle hereinafter.

That is to say, even if the pieces of the pattern information in the plurality of the unit periods TP are not similar to each other, the clock signal CL3 can be determined to be the unexpected clock signal CL2 (the regular clock signal CLb) when there is no long cycle. It may be determined that there is the long cycle when the number of long cycles in a second predetermined period (also referred to as a long cycle number hereinafter) is larger than a second number reference value in view of noise, for example. The second predetermined period and the second number reference value are previously set, for example. The second predetermined period is set so that probability that the cycle of the expected clock signal CL1 in the second predetermined period is longer than the reference value Tref2 is sufficiently high.

FIG. 17 is a drawing illustrating an example of a determination condition according to the third embodiment. As illustrated in FIG. 17, when the pieces of the pattern information are not similar to each other and there is the long cycle in the second predetermined period (that is to say, the long cycle number is larger than the second number reference value in the second predetermined period), the clock determination apparatus 1C determines that the clock signal CL3 is the expected clock signal CL1. In the meanwhile, when there is no long cycle in the second predetermined period (that is to say, the long cycle number in the second predetermined period is smaller than the second number reference value), the clock determination apparatus 1C determines that the clock signal CL3 is the unexpected clock signal CL2 even if the pieces of the pattern information are not similar to each other.

When the pieces of the pattern information are similar to each other, the clock determination device 1C determines that the clock signal CL3 is the unexpected clock signal CL2 regardless of the magnitude of the long cycle number.

According to this configuration, even if the unexpected clock signal CL2 having substantially the same degree of constant cycle as the reference value Tref1 is input to the information processing device 10 as the clock signal CL3, the clock determination apparatus 1C can appropriately determine that the clock signal CL3 is the unexpected clock signal CL2. A detailed example of the inner configuration of the clock determination apparatus 1C is described hereinafter.

In the example in FIG. 15, the clock determination apparatus 1C includes the clock determiner 18 and the long cycle determiner 19. The long cycle determiner 19 determines whether or not the long cycle number in the second predetermined period is larger than the second number reference value based on the clock signal CL3, and outputs a determination result J24 to the clock determiner 18. The determination result J24 is indicated by H/L of an electrical signal. For example, the determination result J24 shows L when the long cycle number is equal to or larger than the second number reference value, and the determination result J24 shows H when the long cycle number is smaller than the second number reference value.

In the example in FIG. 15, the long cycle determiner 19 includes a plurality of delay elements 191, a cycle determination circuit 192, a synchronous circuit 193, counters 194 and 195, and a comparison circuit 196. The clock signal CL3 is input to the plurality of the delay elements 191. The plurality of the delay elements 191 delays the clock signal CL3 with delay times different from each other in the manner similar to the delay elements 131, 161, and 171. In the example in FIG. 15, the plurality of the delay elements 191 are arranged side by side. An order in accordance with an arrangement order is introduced hereinafter for a purpose of description. A first delay element 191 means a delay element 191 arranged at a front of the arrangement order.

The delay time of a $w^{th}$ delay element 191 is set to a product of a predetermined time $\Delta t4$ and w (w·$\Delta t4$), for example. That is to say, a difference between the delay times of the delay elements 191 is set to the predetermined time $\Delta t4$. The predetermined time $\Delta t4$ is set to 4 [ns], for example, on a condition similar to the predetermined times $\Delta t1$ to $\Delta t3$.

A number N4 of the delay element 191 is set so that a product of the number N4 and the predetermined time $\Delta t4$ (N4·$\Delta t4$) is equal to or larger than the reference value Tref2 (for example, 40 [ns]), and is set to ten, for example. The output signal of the $w^{th}$ delay element 191 is also referred to as the signal D4 [w] hereinafter. When the output signals of the several delay elements 191 are the same as the output signals of the several delay elements 131 (or the delay element 161 or the delay element 171), they may double as each other.

The signals D4 [1] to D4 [10] are input from the ten delay elements 191 to the cycle determination circuit 192. A plurality of the reference patterns in a case where the cycle is longer than the reference value Tref2 are previously stored in the cycle determination circuit 192. The reference patterns can be set in the manner similar to the reference pattern of the cycle determination circuit 132, thus a specific example thereof is omitted. The cycle determination circuit 192 determines whether or not the signal patterns of the signals D4 [10] to D4 [1] coincide with one of the plurality of the reference patterns, and outputs a determination result J14 thereof to the synchronous circuit 193. The determination result J14 is indicated by H/L of an electrical signal. For example, the determination result J14 shows H when the signal pattern coincides with one of the reference patterns, and the determination result J14 shows L when the signal pattern does not coincide with any of the reference patterns.

The clock signal CL3 is also input to the synchronous circuit 193. In the manner similar to the synchronous circuit 133, the synchronous circuit 193 detects a rising edge of the clock signal CL3, for example, and outputs, to the counter 195, the determination result J14 of the cycle determination circuit 192 at the time of detecting the rising edge.

The clock signal CL3 is also input to the counter 195. The counter 195 performs the count operation in synchronization with the clock signal CL3 in the manner similar to the counter 123, and counts a total number of the determination results J14 showing H. Thus, the count value CT6 of the counter 195 indicates the number of long cycles longer than the reference value Tref2 (the long cycle number). The counter 195 outputs the count value CT6 to the comparison circuit 196. The count value CT6 is initialized to zero every second predetermined period.

The clock signal CL3 is input to the counter 194. The counter 194 counts the cycle number of the clock signal CL3 in the manner similar to the counter 122, and outputs the count value CT5 to the comparison circuit 196. Herein, the counter 194 functions as a timer for counting the second predetermined period. The second predetermined period is regulated by a predetermined cycle number of the clock signal CL3. The counter 194 initializes the count value CT5 to zero every predetermined cycle number (the second predetermined period).

The comparison circuit 196 detects the lapse of the second predetermined period based on the count value CT5, and compares the count value CT6 in the state where the second predetermined period has passed (the long cycle number) and the second number reference value. Then, the comparison circuit 196 outputs the comparison result as the determination result J24 to the clock determiner 18. The determination result J24 shows L when the count value CT6 is equal to or larger than the second number reference value, and shows H when the count value CT6 is smaller than the second number reference value. The second number reference value is one, for example.

The clock determiner 18 determines whether the clock signal CL3 is the expected clock signal CL1 or the unexpected clock signal CL2 based on the determination results J21 and J24, and outputs the determination result J2 to the function control device 2. The determination condition is as described above (FIG. 17). Specifically, the clock determiner 18 determines that the clock signal CL3 is the expected clock signal CL1 when both the determination results J21 and J24 show L, and determines that the clock signal CL3 is the unexpected clock signal CL2 when at least one of the determination results J21 and J24 shows H.

As described above, the clock determiner 18 determines whether the clock signal CL3 is the expected clock signal CL1 or the unexpected clock signal CL2 based on not only the similarity determination of the pattern information in the unit period TP (the determination result J21) but also the presence or absence of the long cycle (the determination result J24). Accordingly, even if the clock signal CL3 is the clock signal having substantially the same degree of constant cycle as the reference value Tref1, the clock determination apparatus 1C can appropriately determine that the clock signal CL3 is the unexpected clock signal CL2.

<Short Cycle Determiner>

In the example described above, the reference value Tref2 is set to be larger than the reference value Tref1. However, the reference value Tref2 may be set to be smaller than the reference value Tref1. The reference value Tref2 is set to be smaller than the reference value Tref1, and is set to 20 [ns], for example. That is to say, the unexpected clock signal CL2 having substantially the same degree of cycle as the reference value Tref1 has the cycle not shorter than the reference value Tref2, however, the fluctuation variation of the cycle of the expected clock signal CL1 is large, thus the cycle may be shorter than the reference value Tref2 in some cases.

Thus, even if the pieces of the pattern information in the plurality of the unit periods TP are not similar to each other, the clock signal CL3 is determined to be the unexpected clock signal CL2 when there is no short cycle shorter than the reference value Tref2 (also refer to FIG. 17). It may be determined that there is the short cycle when the number of short cycles in the second predetermined period (also referred to as a short cycle number hereinafter) is larger than a third number reference value in view of noise, for example.

Figure 18:
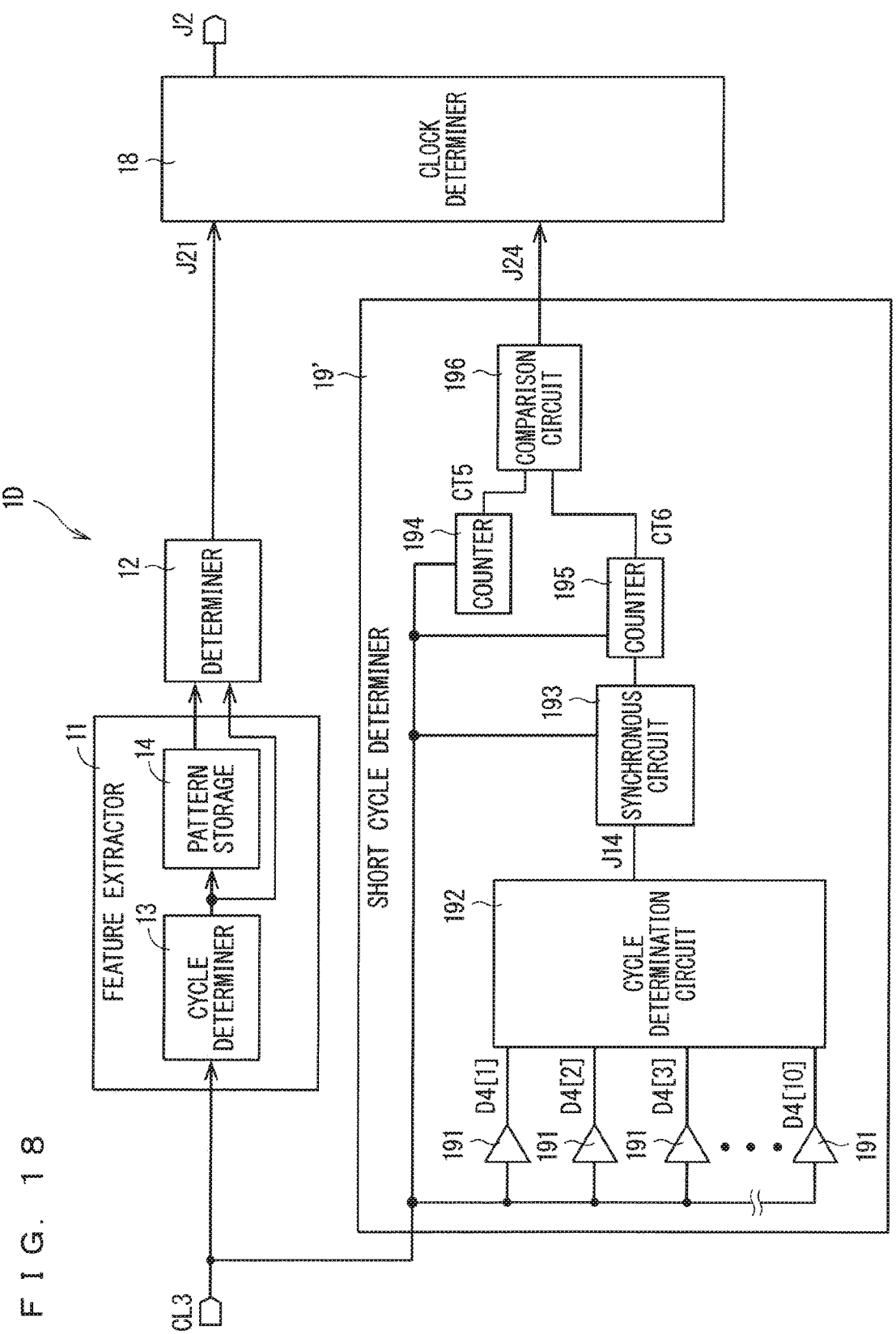
FIG. 18 is a drawing schematically illustrating an example of an inner configuration of a clock determination apparatus.

FIG. 18 is a drawing schematically illustrating an example of a configuration of a clock determination apparatus 1D. The clock determination apparatus 1D differs from the clock determination apparatus 1C in that the short cycle determiner 19' is provided in place of the long cycle determiner 19.

The short cycle determiner 19' determines whether or not the short cycle number in the second predetermined period is larger than the third number reference value. An inner configuration of the short cycle determiner 19' is similar to the long cycle determiner 19. However, the cycle determination circuit 192 of the short cycle determiner 19' outputs "H" as the determination result J14 when the signal patterns of the signals D4 [1] to D4 [10] do not coincide with any of the plurality of the reference patterns, and outputs "L" as the determination result J14 when the signal patterns coincide with any of the plurality of the reference patterns.

Accordingly, the synchronous circuit 193 of the short cycle determiner 19' outputs "H" when the cycle T is shorter than the reference value Tref2, and outputs "L" when the cycle T is longer than the reference value Tref2. Thus, the counter 195 of the short cycle determiner 19' counts the number of the short cycles shorter than the reference value Tref2 (the short cycle number). The comparison circuit 196 of the short cycle determiner 19' outputs "H" as the determination result J24 when the short cycle number in the second predetermined period (the count value CT6) is equal to or larger than the third number reference value, and outputs "L" as the determination result J24 when the short cycle number is smaller than the third number reference value. The third number reference value is one, for example.

According to this configuration, the clock determiner 18 determines whether the clock signal CL3 is the expected clock signal CL1 or the unexpected clock signal CL2 based on not only the similarity determination of the pattern information in the unit period TP (the determination result J21) but also the presence or absence of the short cycle (the determination result J24). Accordingly, even if the clock signal CL3 is the clock signal having substantially the same degree of constant cycle as the reference value Tref1, the clock determination apparatus 1D can appropriately determine that the clock signal CL3 is the unexpected clock signal CL2.

Fourth Embodiment

Figure 19:
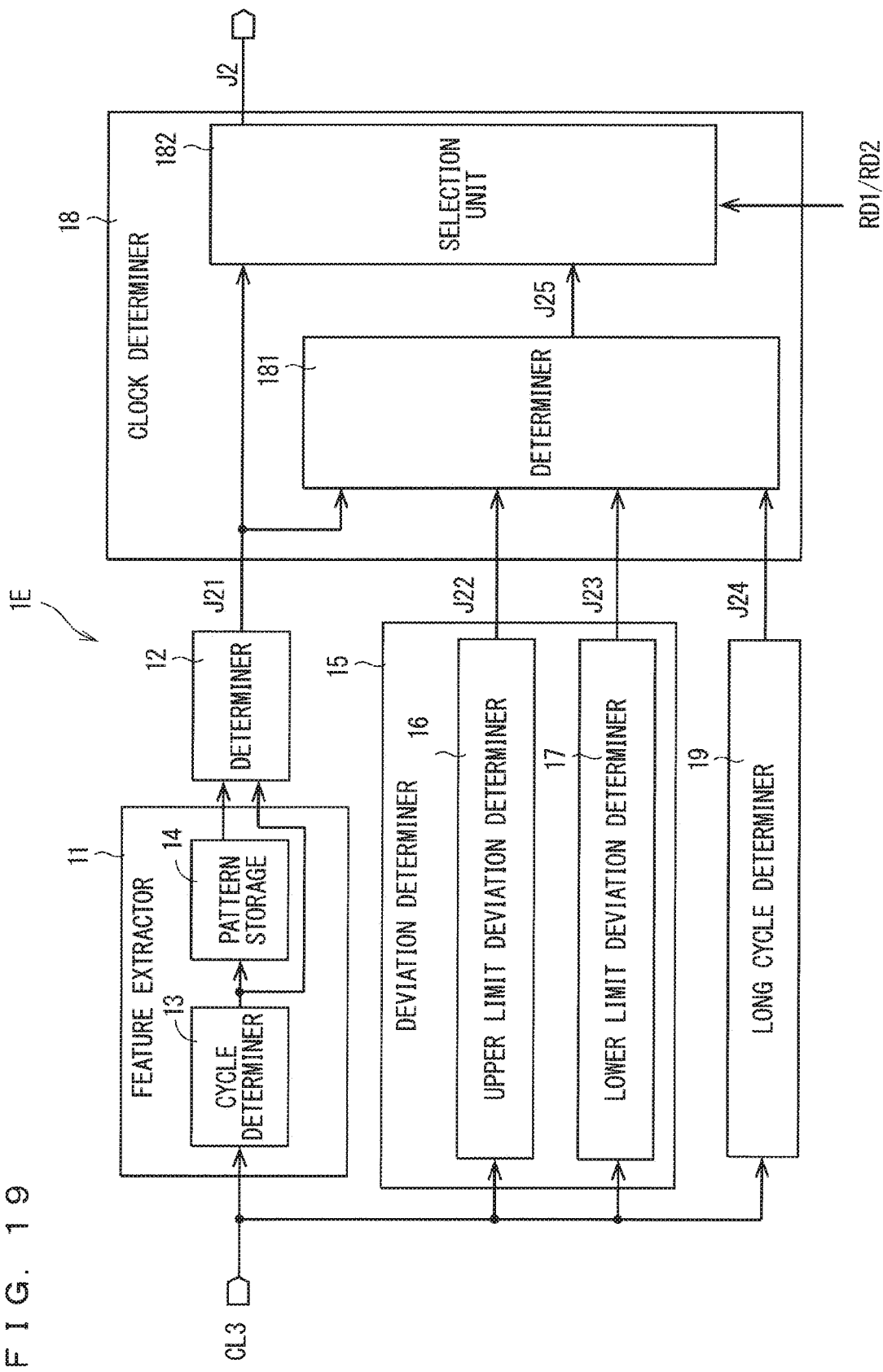
FIG. 19 is a drawing schematically illustrating an example of an inner configuration of a clock determination apparatus.

The clock determination apparatus 1 described in the first to third embodiments can be mutually combined. FIG. 19 is a drawing schematically illustrating an example of a configuration of a clock determination apparatus 1E. The clock determination apparatus 1E includes the feature extractor 11, the determiner 12, the deviation determiner 15, the long cycle determiner 19, and the clock determiner 18.

The determination results J21 to J24 are input from the determiner 12, the upper limit deviation determiner 16, the lower limit deviation determiner 17, and the long cycle determiner 19, respectively, to the clock determiner 18. The clock determiner 18 does not constantly perform the determination processing of the clock signal CL3 using all of the determination results J21 to J24, but performs the determination processing of the clock signals CL3 using the determination result in accordance to the processing content of the processing device 3.

More specifically, the clock determiner 18 performs the determination processing of the clock signal CL3 using more determination results as a degree of importance (or secrecy, the same applies to the following description) of the processing of the processing device 3 is higher. Then, the clock determiner 18 outputs the determination result J2 thereof to the function control device 2. A specific example is described hereinafter.

In the example in FIG. 19, the clock determiner 18 includes a determiner 181 and a selection unit 182. The determination results J21 to J24 are input to the determiner 181. The determiner 181 performs the determination processing of the clock using all of the determination results J21 to J24, and outputs a determination result J25 thereof to the selection unit 182. The determination result J25 is indicated by H/L of an electrical signal. For example, when the clock signal CL3 is determined to be the expected clock signal CL1, the determination result J25 shows L, and when the clock signal CL3 is determined to be the unexpected clock signal CL2, the determination result J25 shows H.

FIG. 20 is a drawing illustrating an example of a determination condition performed by the determiner 181 in tabular form. The determiner 181 determines that the clock signal CL3 is the expected clock signal CL1 when the following conditions are established. That is to say, the determiner 181 determines that the clock signal CL3 is the expected clock signal CL1 when the pieces of the pattern information in the plurality of unit periods TP are not similar to each other (the determination result J21 shows L), there is the long cycle (or the short cycle) in the second predetermined period (the determination result J24 shows L), and the cycle of the clock signal CL3 is within the allowable range (both of the determination results J22 and J23 show L). That is to say, the determiner 181 determines that the clock signal CL3 is the expected clock signal CL1 when all of the determination results J21 to J24 show L.

In the meanwhile, the determiner 181 determines that the clock signal CL3 is the unexpected clock signal CL2 when at least one of the following three conditions is established. That is to say, a first condition indicates that the pieces of the pattern information in the plurality of unit periods TP are similar to each other (the determination result J21 shows H). A second condition indicates that the pieces of the pattern information in the plurality of unit periods TP are not similar to each other and there is no long cycle (or no short cycle) in the second predetermined period (the determination results J21 and J24 show L and H, respectively). A third condition indicates that the cycle of the clock signal CL3 is out of the allowable range (the determination result J22 or the determination result J23 shows H). In short, the determiner 181 determines that the clock signal CL3 is the unexpected clock signal CL2 when at least one of the determination results J21 to J24 shows H.

The determination result J21 from the determiner 12, the determination result J25 from the determiner 181, and the request signals RD1 and RD2 from the processing device 3 are input to the selection unit 182. The request signal RD1 is output when the processing device 3 starts the normal processing, and the request signal RD2 is output when the processing device 3 starts the confidential processing. Thus, the selection unit 182 outputs the determination result J21 as the determination result J2 to the function control device 2 when the request signal RD1 is input (that is to say, when the processing device 3 performs the normal processing). The selection unit 182 outputs the determination result, which is transmitted from the determiner 181, as the determination result J2 to the function control device 2 when the request signal RD2 is input (that is to say, when the processing device 3 performs the confidential processing).

Accordingly, the determination processing of the clock signal CL3 can be executed with a higher degree of accuracy during the execution of the confidential processing of higher importance, and the determination processing of the clock signal CL3 can be executed with a lower degree of accuracy during the execution of the normal processing of lower importance. That is to say, the determination processing of the clock signal CL3 can be executed in accordance with the importance of the processing.

It is also applicable to classify the processing content of the processing device 3 into three levels in accordance with the importance, and use the determination results J21 to J24 in accordance with the levels. For example, the clock determiner 18 may use only the determination result J21 when the level of the processing content of the processing device 3 is the lowest, may use the determination results J21 to J23 in the manner similar to the second embodiment when the level is substantially middle, and may use all of the determination results J21 to J24 as described above when the level is the highest.

Fifth Embodiment

Figure 21:
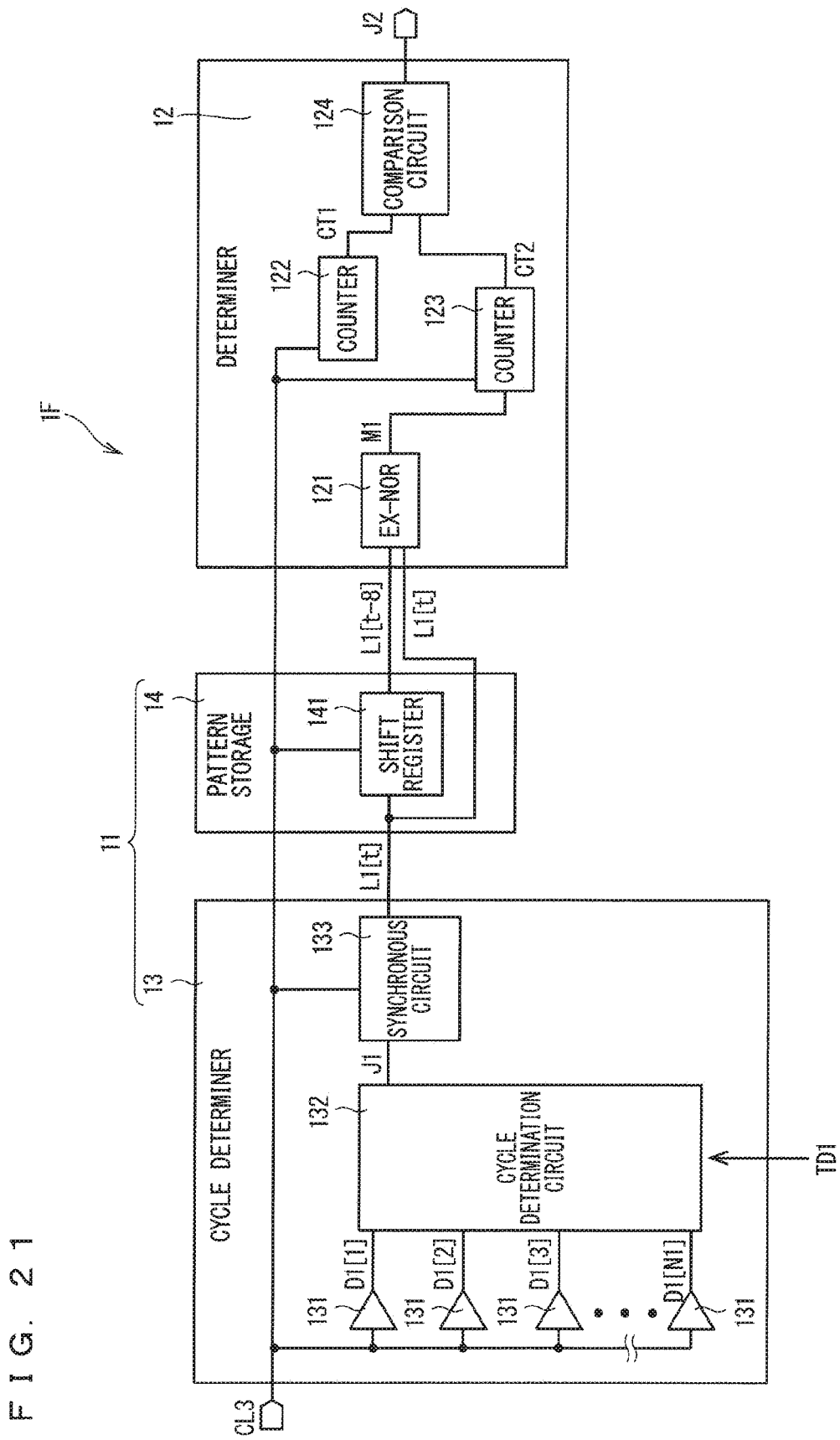
FIG. 21 is a drawing schematically illustrating an example of an inner configuration of a clock determination apparatus.

Intended in the fifth embodiment is that the reference value Tref1 is variable. FIG. 21 is a drawing schematically illustrating an example of a configuration of a clock determination apparatus 1F. The clock determination apparatus 1F differs from the clock determination apparatus 1 in the number of the delay elements 131 and the function of the cycle determination circuit 132.

A number N1 of the delay element 131 is set so that a product of the number N1 and the predetermined time Δt1 (N1·Δt1) is equal to or larger than the reference value Tref1 in the manner similar to the first embodiment. However, intended in the fifth embodiment is that the reference value Tref1 is variable, thus the number N1 is set so that the product (N1·Δt1) is equal to or larger than a maximum value in a variable range of the reference value Tref1. Herein, the predetermined time Δt1 is set to 3 [ns], and the number N1 is set to 20 as an example.

A reference designation signal TD1 is input to the cycle determination circuit 132. The reference designation signal TD1 is generated by an optional device (for example, the clock determination apparatus 1F, the function control device 2, or the processing device 3). The reference designation signal TD1 is a signal for designating the value of the reference value Tref1. Herein, the reference designation signal TD1 designates one of a first value Tref11 and a second value Tref12 as the value of the reference value Tref1. However, the reference value Tref1 is designated by an integral multiple of the predetermined time Δt1. For example, the first value Tref11 is 30 (=10×3) [ns], and the second value Tref12 is 36 (12×3)[ns].

A reference pattern group for each reference value Tref1 which can be designated is stored in the cycle determination circuit 132. FIG. 22 is a drawing illustrating examples of a reference pattern group in a case where the reference value Tref1 is the first value Tref11 (30 [ns]) and a reference pattern group in a case where the reference value Tref1 is the second value Tref12 (36 [ns]).

When the reference value Tref1 is the first value Tref11 (30 [ns]), ten reference patterns are stored to correspond to the signal patterns of the ten signals D1 [10] to D1 [1] in the manner similar to FIG. 9. When the reference value Tref1 is the second value Tref12 (36 [ns]), twelve reference patterns are stored to correspond to the twelve signals D1 [12] to D1 [1]. That is to say, when the reference value Tref1 is M·Δt [ns], M reference patterns are stored to correspond to the signal patterns of the M signals D1 [M] to D1 [1].

The cycle determination circuit 132 determines whether or not the signal patterns of the M signals D1 [M] to D1 [1] corresponding to the reference designation signal TD1 coincide with one of the M reference patterns corresponding to the reference designation signal TD1, and outputs the determination result J1 to the synchronous circuit 133.

Specifically, when the reference designation signal TD1 designates the reference value Tref1 as the first value Tref11, the cycle determination circuit 132 determines whether or not the signal patterns of the signals D1 [10] to D1 [1] coincide with one of the ten reference patterns corresponding to the first value Tref11. When the signal patterns coincide with one of the reference patterns, the cycle thereof is longer than the first value Tref11, thus the cycle determination circuit 132 outputs H as the determination result J1. In the meanwhile, when the signal patterns do not coincide with any of the reference patterns, the cycle thereof is shorter than the first value Tref11, thus the cycle determination circuit 132 outputs L as the determination result J1.

According to this configuration, the clock determination apparatus 1F can generate the pattern information using the length determination using the first value Tref11, and can determine whether the clock signal CL3 is the expected clock signal CL1 or the unexpected clock signal CL2 based on the similarity determination of the pattern information.

When the reference designation signal TD1 designates the reference value Tref1 as the second value Tref12, the cycle determination circuit 132 determines whether or not the signal patterns of the signals D1 [12] to D1 [1] coincide with one of the twelve reference patterns corresponding to the second value Tref12. When the signal patterns coincide with one of the reference patterns, the cycle thereof is longer than the second value Tref12, thus the cycle determination circuit 132 outputs H as the determination result J1. In the meanwhile, when the signal patterns do not coincide with any of the reference patterns, the cycle thereof is shorter than the second value Tref12, thus the cycle determination circuit 132 outputs L as the determination result J1.

According to this configuration, the clock determination apparatus 1F can generate the pattern information using the length determination using the second value Tref12, and can determine whether the clock signal CL3 is the expected clock signal CL1 or the unexpected clock signal CL2 based on the similarity determination of the pattern information.

An average cycle of the expected clock signals CL1 (the random clock signals CLa) may be adopted as the reference designation signal TD1. For example, the clock generation device 20 may output the reference value designation signal TD1 to designate the average cycle of the expected clock signal CL1 as the reference value Tref1. Alternatively, when the processing device 3 transmits a request of the average cycle of the random clock signal CLa to the clock generation device 20, the request signal thereof may be input to the cycle determination circuit 132 as the reference value designation signal TD1.

Accordingly, the accuracy of the clock determination can be enhanced. This point is described in detail hereinafter. When the reference value Tref1 significantly deviates from the average cycle of the expected clock signal CL1, the result of the length determination tends to be biased. For example, when the reference value Tref1 is larger than the average cycle, the cycle of the expected clock signal CL1 has a high probability of being shorter than the reference value Tref1. That is to say, there is a high probability of being determined to be the short cycle as the result of the length determination. Accordingly, the similarity ratio (coinciding number) tends to be high even in the case of the expected clock signal CL1, and the clock signal tends to be erroneously determined to be the unexpected clock signal CL2. Conversely, such a decrease in the accuracy of the clock determination can be avoided by adopting the average cycle as the reference value Tref1.

The reference designation signal TD1 is preferably updated after performing the determination processing of the clock signal CL3 at least once. For example, when the determiner 12 outputs the reference designation signal TD1, the determiner 12 firstly outputs the reference designation signal TD1 for designating the first value Tref11 to the cycle determination circuit 132. Accordingly, the determiner 12 adopts the first value Tref11 and performs the determination processing of the clock signal CL3. That is to say, the determiner 12 determines whether or not the pieces of the pattern information generated by the length determination based on the first value Tref11 are similar to each other in the plurality of the unit periods TP to perform the determination processing of the clock signal CL3.

Subsequently, the determiner 12 outputs the reference designation signal TD1 for designating the second value Tref12 to the cycle determination circuit 132. For example, when the determiner 12 performs the determination processing of the clock signal CL3 adopting the first value Tref11 a predetermined number of times, the determiner 12 outputs the reference designation signal TD1 for designating the second value Tref12. Accordingly, the determiner 12 adopts the second value Tref12 and performs the determination processing of the clock signal CL3. That is to say, the determiner 12 determines whether or not the pieces of the pattern information generated by the length determination based on the second value Tref12 are similar to each other in the plurality of the unit periods TP to perform the determination processing of the clock signal CL3.

As described above, according to the clock determination apparatus 1F, the reference value Tref1 using for the length determination is varied to perform the determination processing of the clock signal CL3. Accordingly, the accuracy of the determination processing can be enhanced as described below. For example, considered is a case where the third party inputs, as the clock signal CL3, the unexpected clock signal CL2 having substantially the same degree of constant cycle as the first value Tref11 to the information processing device 10. In this case, the result of the length determination using the first value Tref11 is varied, thus the clock signal CL3 is erroneously determined to be the expected clock signal CL1 in the determination processing using the first value Tref11. However, the result of the length determination using the second value Tref12 is not varied, thus the clock signal CL3 is appropriately determined to be the unexpected clock signal CL2 by the determination processing using the second value Tref12. As described above, even if the clock signal CL3 is determined to be the expected clock signal CL1 once, the clock signal CL3 is determined to be the unexpected clock signal CL2 in the subsequent determination processing. Thus, the accuracy of the determination processing of the clock signal can be enhanced.

The clock determination apparatus 1F preferably updates the reference value Tref1 repeatedly. For example, the clock determination apparatus 1F preferably updates the reference value Tref1 from the first value to the $K^{th}$ value sequentially, and then updates the first value again.

MODIFICATION EXAMPLE

Figure 23:
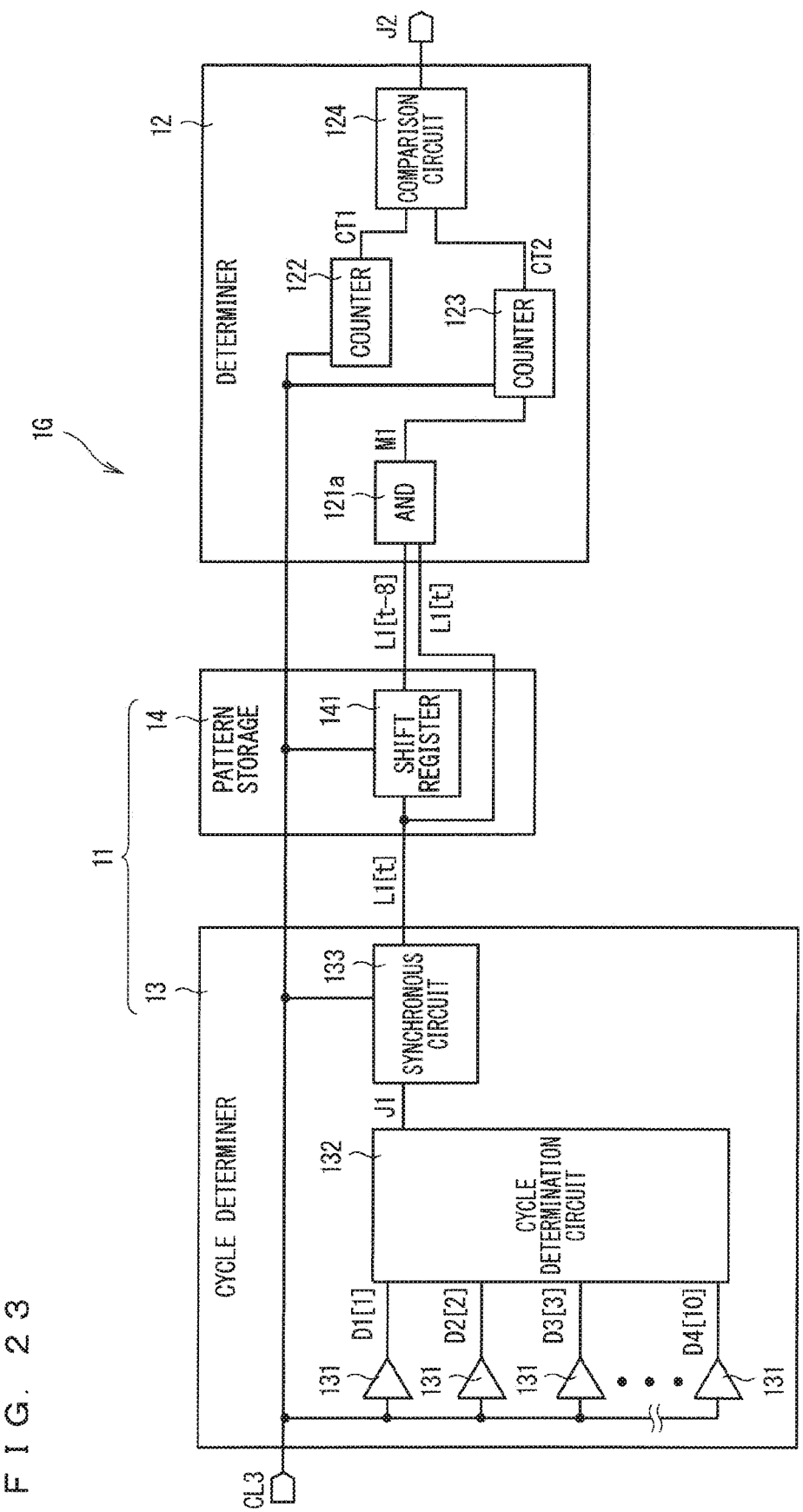
FIG. 23 is a drawing schematically illustrating an example of an inner configuration of a clock determination apparatus.

FIG. 23 is a drawing schematically illustrating an example of a configuration of a clock determination apparatus 1G. The clock determination apparatus 1F differs from the clock determination apparatus 1 in that an AND unit 121a is provided in place of the EX-NOR unit 121. The pieces of the length information L1 [t-8] and L1 [t] are input to the AND unit 121a. The AND unit 121a includes an AND circuit, outputs "1" as the coinciding/non-coinciding information M1 to the counter 123 when both the pieces of the length information L1 [t-8] and L1 [t] show H, and outputs "0 (zero)" as the coinciding/non-coinciding information M1 to the counter 123 when at least one of the pieces of the length information L1 [t-8] and L1 [t] shows L.

According to this configuration, when the cycle in the same order (position) in the unit periods TP1 and TP2 is longer than the reference value Tref1, the count value CT2 is incremented. When the clock signal CL3 is the unexpected clock signal CL2 (the regular clock signal CLb), the cycle thereof is substantially constant, thus the result of the length determination is always constant. Thus, when the cycle of the clock signal CL3 is longer than the reference value Tref1, ideally speaking, the count value CT2 in the state where the unit period TP has passed coincides with the cycle number constituting the unit period TP (eight, herein). Thus, the comparison circuit 124 determines whether or not the count value CT2 for each unit period TP is larger than the reference value (for example, six). When the count value CT2 is larger than the reference value, the determination result J2 indicating that the clock signal CL3 is the unexpected clock signal CL2 (the regular clock signal CLb) is output.

In the example described above, the counter 123 counts the number of the pieces of the length information L1 [t-8] and L1 [t] both showing H, however, it is also applicable to provide a counter which counts the number of the pieces of the length information L1 [t-8] and L1 [t] both showing L. In this case, the AND unit 121a outputs "1" to the counter when both the pieces of the length information L1 [t-8] and L1 [t] show L, and outputs "0 (zero)" to the counter when at least one of the pieces of the length information L1 [t-8] and L1 [t] shows H. When the clock signal CL3 is the unexpected clock signal CL2 shorter than the reference value Tref1, ideally speaking, the count value of the counter coincides with the cycle number of the unit period TP (eight, herein). Thus, the comparison circuit 124 also determines whether or not the count value for each lapse of the unit period TP is larger than the reference value (for example, six). When the count value is larger than the reference value, the determination result J2 indicating that the clock signal CL3 is the unexpected clock signal CL2 (the regular clock signal CLb) is output.

The various embodiments described above exemplify the clock signal CL2 generated by the illegal clock generation device 20' as the unexpected clock signal. However, the configuration is not limited thereto. Even when the random clock signal CLa is output in the period when the regular clock signal CLb should be output due to the erroneous operation of the clock generation device 20, for example, the clock determination apparatus 1 can detect the random clock signal CLa as the unexpected clock signal.

In the various embodiment described above, the cycle of the random clock signal CLa changes substantially irregularly, thus the length information of the cycle is used. However, when the duty of the random clock signal CLa changes substantially irregularly, the length information of the duty may be used. That is to say, the feature extractor 11 may determine whether or not the duty of each cycle in the unit period TP is longer than the reference value Dref. That is to say, the duty information indicating whether or not the duty is longer than the reference value Dref is output. In the various embodiment described above, the length information may be switched to the duty information.

As described above, the information processing device 10 has been shown and described in detail, the foregoing description is in all aspects illustrative, thus the present invention is not limited thereto. The various embodiments described above can be implemented in combination as long as they are not mutually inconsistent. Various modifications not exemplified are construed to be made without departing from the scope of the present invention.

What is claimed is:

1. A clock determination apparatus, comprising:
a signal wire to which a clock signal is input; and
circuitry configured to
calculate a similarity ratio of waveforms of the clock signal among a plurality of the unit periods, each of the plurality of unit periods including a predetermined number of cycles of the clock signal, and
determine whether the clock signal is a random clock signal including a cycle changing substantially irregularly as time proceeds or a regular clock signal including substantially a constant cycle, based on the similarity ratio of the waveforms of the clock signal among the plurality of unit periods.

2. The clock determination apparatus according to claim 1, wherein the circuitry is further configured to
generate length information indicating whether each cycle of the predetermined number of cycles included in each of the unit periods is longer than or shorter than a first reference value,
calculate the similarity ratio of the waveforms of the clock signal among the plurality of the unit periods based on the length information, and
determine that the clock signal is the regular clock signal when the similarity ratio is higher than a similarity ratio reference value.

3. The clock determination apparatus according to claim 2, wherein
when the predetermined number of the cycles is indicated by N, the circuitry determines whether or not nth length information corresponding to nth order of the cycle in each of the plurality of the unit periods coincide with each other for the first to Nth orders of the cycle, the n indicating a natural number of 1 to N, and calculates a total number of the cycles as the similarity ratio, the total number of the cycles being a number of the cycles which length information being determined as coinciding with each other.

4. The clock determination apparatus according to claim 2, wherein
the length information is binary information indicating whether the cycle is longer or shorter than the first reference value.

5. The clock determination apparatus according to claim 2, further comprising
a plurality of delay elements delaying the clock signal with delay times different from each other,
wherein the circuitry is further configured to detect an edge of the clock signal,
determine whether or not each signal pattern output from each of the plurality of the delay elements coincides with any of a plurality of reference patterns,
determine that the cycle of the clock signal is longer than the first reference value, when the signal pattern at a time of detecting an edge of the clock signal coincides with any of the plurality of the reference patterns,
determine that the cycle of the clock signal is shorter than the first reference value, when the signal pattern at the time of detecting the edge of the clock signal does not coincide with any of the plurality of the reference patterns and then generates the length information, and
wherein the plurality of the reference patterns are patterns covering the signal pattern when the cycle of the clock signal is longer than the first reference value.

6. The clock determination apparatus according to claim 2, wherein the circuitry is further
configured to determine whether each cycle of the predetermined number of cycles included in each of the unit periods is longer than a second reference value, in addition to determination whether the cycle is longer than the first reference value, the second reference value being larger than the first reference value,
determine that the clock signal is a regular clock signal, when a number of cycles determined based on the second reference value is determined to be larger than a predetermined number, even if the similarity ratio based on the length information in association with the first reference value is lower than the similarity ratio reference value.

7. The clock determination apparatus according to claim 6, wherein the circuitry is further
configured to determine whether or not the cycle of the clock signal is within an allowable range, wherein
wherein the circuitry is configured to perform at least one of a first determination, a second determination, and a third determination, the first determination indicating whether or not the similarity ratio is higher than the similarity ratio reference value, the second determination indicating whether or not the cycle of the clock signal is within the allowable range, and the third determination indicating a comparison result of comparing the cycle number and the predetermined number,
wherein the circuitry is configured to set a total number of determination among the first to the third determination, in accordance with a degree of importance of a target processing performed by a processing device.

8. The clock determination apparatus according to claim 2, wherein the circuitry is further
configured to determine whether each cycle of the predetermined number of cycles included in each of the unit periods is shorter than a third reference value, in addition to determination whether the cycle is longer than the first reference value, the third reference value being smaller than the first reference value,
determine that the clock signal is a regular clock signal, when a number of cycles determined based on the third reference value is determined to be larger than a predetermined number, even if the similarity ratio based on the length information in association with the first reference value is lower than the similarity ratio reference value.

9. The clock determination apparatus according to claim 2, wherein
a designation signal for designating the first reference value is input to the circuitry.

10. The clock determination apparatus according to claim 2, wherein the circuitry is further configured to adopt
a first value as the first reference value to generate length information, and subsequently adopts a second value different from the first value as the first reference value to generate length information.

11. The clock determination apparatus according to claim 1, wherein the circuitry is further
configured to determine whether or not the cycle of the clock signal is within an allowable range, wherein
when the cycle of the clock signal is not within the allowable range, the circuitry determines that the clock signal is an unexpected clock signal.

12. The clock determination apparatus according to claim 1, wherein the circuitry is configured to determine whether the clock signal is the random clock signal or the regular clock signal,
only when a processing device operating based on the clock signal performs confidential processing with higher secrecy than normal processing.

13. The clock determination apparatus according to claim 1, wherein
the plurality of the unit periods are three or more unit periods.

14. A clock determination method, comprising
calculating a similarity ratio of waveforms of the clock signal among a plurality of the unit periods, each of the plurality of unit periods including a predetermined number of cycles of the clock signal, and
determining whether the clock signal is a random clock signal including a cycle changing substantially irregularly as time proceeds or a regular clock signal including substantially a constant cycle, based on the similarity ratio of the waveforms of the clock signal among the plurality of unit periods.

* * * * *